(12) United States Patent
Berntorp

(10) Patent No.: US 11,203,354 B2
(45) Date of Patent: Dec. 21, 2021

(54) SYSTEM AND METHOD FOR DETERMINING FRICTION CURVE OF TIRE

(71) Applicant: Mitsubishi Electric Research Laboratories, Inc., Cambridge, MA (US)

(72) Inventor: Karl Berntorp, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 112 days.

(21) Appl. No.: 16/801,846

(22) Filed: Feb. 26, 2020

(65) Prior Publication Data

US 2021/0261145 A1    Aug. 26, 2021

(51) Int. Cl.
*B60W 50/00* (2006.01)
*B60W 50/06* (2006.01)
(Continued)

(52) U.S. Cl.
CPC ...... *B60W 50/06* (2013.01); *B60W 30/18172* (2013.01); *B60W 40/068* (2013.01);
(Continued)

(58) Field of Classification Search
CPC ........... B60W 50/06; B60W 30/18172; B60W 40/068; B60W 2050/0031; B60W 2050/0052; B60W 2050/0083; B60W 2520/06; B60W 2520/10; B60W 2520/105; B60W 2520/26
See application file for complete search history.

(56) References Cited

U.S. PATENT DOCUMENTS

2013/0261914 A1 * 10/2013 Ingram ................. G01C 21/34
 701/70
2016/0368503 A1 * 12/2016 Jonasson ............. B60W 40/068
(Continued)

OTHER PUBLICATIONS

Berntorp et al. Bayesian Tire Friction Learning by Gaussian Process State Space Models, 2019, 18th European Control Conference, Jun. 25, 2019, pp. 231-236.
(Continued)

*Primary Examiner* — Thomas G Black
*Assistant Examiner* — Brittany Renee Peko
(74) *Attorney, Agent, or Firm* — Gennadiy Vinokur; Hironori Tsukamoto

(57) ABSTRACT

A system for controlling a vehicle by jointly estimating a state of a vehicle and a function of a tire friction of a vehicle traveling on a road uses a particle filter maintaining a set of particles. Each particle includes an estimation of a state of the vehicle, an estimation of probability density function (pdf) of the tire friction function, and a weight indicative of a probability of the particle. The system executes the particle filter to update the particles based on a motion model and a measurement model of the vehicle, control commands moving the vehicle and measurements of the state where the vehicle moved according to the control commands. A control command is generated based on the motion of the vehicle, the weighted combinations of the state of the vehicle and the pdf of the tire friction function weighted according corresponding weights of the particles.

16 Claims, 29 Drawing Sheets

(51) Int. Cl.
*B60W 40/068* (2012.01)
*B60W 30/18* (2012.01)

(52) U.S. Cl.
CPC ............... *B60W 2050/0031* (2013.01); *B60W 2050/0052* (2013.01); *B60W 2050/0083* (2013.01); *B60W 2520/06* (2013.01); *B60W 2520/10* (2013.01); *B60W 2520/105* (2013.01); *B60W 2520/26* (2013.01)

(56) References Cited

U.S. PATENT DOCUMENTS

2018/0015931 A1    1/2018  Merl
2018/0136660 A1*   5/2018  Mudalige ............... G05D 1/021
2018/0273046 A1    9/2018  Merl

OTHER PUBLICATIONS

Bing Fei Wu et al. An Intelligent Wheelchair Anti Lock Break system design with Friction coefficient estimation. Ieee Access, vol. 6, Dec. 3, 2019, pp. 73686-73701.

* cited by examiner

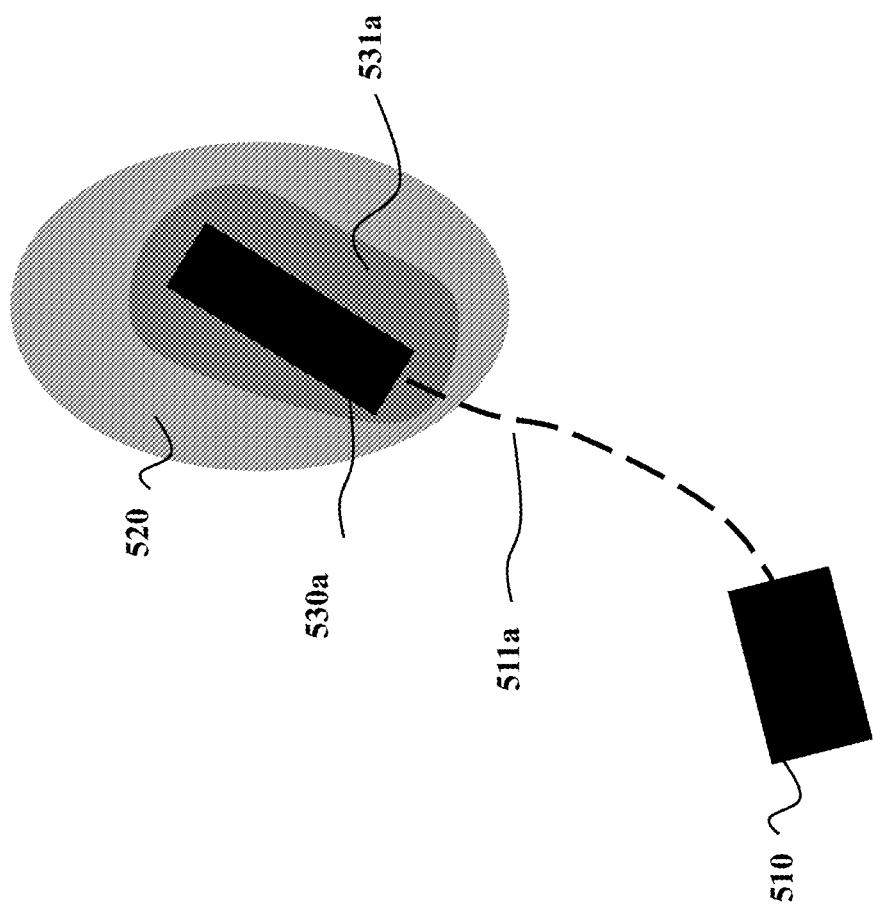

SYSTEM AND METHOD FOR DETERMINING FRICTION CURVE OF TIRE

TECHNICAL FIELD

The invention relates generally to vehicle control, and more particularly to methods and apparatus for determining friction curve of tire recursively in time as data are collected during vehicle control.

BACKGROUND

The tire-to-road interaction is the dominating factor in generating, or changing, the motion of a wheeled vehicle, and the knowledge of variables related to the tire-to-road interaction is essential for many active safety systems in modern vehicles. Parameters related to the road friction are employed in many modern vehicles. For example, anti-lock braking systems (ABS), electronic stability control systems (ECS), and advanced driver-assistance systems (ADAS), all make extensible use of parameters related to the tire-to-road interaction, in order to provide advanced safety mechanisms.

Even though several factors determine the tire-road interaction, it is common to model the tire friction as a static function of the wheel slip. In a longitudinal case, i.e., in the wheel's forward direction, the slip is defined in terms of the difference of the longitudinal velocity and the rotational speed of the wheel normalized by either the rotational speed of the wheel or the longitudinal velocity, whichever one is greater, i.e., whether the wheel is accelerating or braking. In a lateral case, i.e., in the wheel's lateral direction, the slip is defined in terms of a ratio between the wheel's lateral and longitudinal velocity components.

Knowledge of the tire function for a range of slip values is important for reliable vehicle control, as several approaches for enabling ADAS features rely on an accurate model of the tire friction's variation with the slip. Unfortunately, the vehicle states involved in the tire-friction estimation are not directly measured in production vehicles. Therefore, tire-friction estimation is usually done by either indirect friction determination methods, sometimes in combination with sensors that are too expensive to be deployed in production vehicles.

A number of methods aim to estimate the parameters of the tires using various optimization techniques. For example, the method described in U.S. Pat. No. 8,065,067 uses bins of collected data to approximate a nonlinear function and minimizing error of the friction using nonlinear optimization. However, the nonlinear optimization is known to be prone to lack of convergence of convergence in a local optimum. Furthermore, relying on nonlinear optimization necessitates the use of a particular tire model, which is suboptimal because different tire models are suitable for different purposes.

Methods for determining the tire friction are often based on high-precision sensor setups or test rigs. However, high-precision sensors are costly and test rigs are only an approximation of the real world, so that determining a particular tire model in a test rig will only be true for that particular test rig. In addition, in many real-world situations the surface on which the vehicle is traveling changes with time, but methods for determining the tire friction as a function of wheel slip typically process the data when a sufficiently large set of data points has been collected. Hence, methods for determining the tire friction cannot react to situations when the surface changes, e.g., when driving on a road with patches of snow or rain or when changing from asphalt to gravel.

Accordingly, there is a need for a system and a method for adaptively determining the friction between a road surface and a tire while driving using sensors available in production vehicles.

SUMMARY

It is an object of some embodiments to provide a system and a method for determining friction curve of a tire. Additionally, or alternatively, it is another object of some embodiments to provide such a method that is suitable for determining the tire friction in real-time during operation of the vehicle. The friction curve defines tire to road contact friction and is referred herein as a tire friction function. Additionally, or alternatively, it is another object of some embodiments to provide a method that is suitable for determining the tire friction using low-cost sensors that are available in mass-production vehicles. Additionally, or alternatively, it is another object of some embodiments to provide a method for determining the tire friction function that is probabilistic and nonparametric to capture uncertainties common in the real world. Additionally, or alternatively, it is another object of some embodiments to provide a method for determining the tire friction function that does not rely on an a priori determined tire model.

Some embodiments are based on recognition that estimation of a tire friction function from data iteratively collected during real-time vehicle control is sensitive to disturbances and to specifics of the road driven during the time of data collection. Using a probabilistic approach the tire friction determination, it is possible to capture the uncertainties, not only in sensor data but also in specifics of a particular road on which the data were captured. Indeed, using a probabilistic approach gives the possibility to capture uncertainties in motion data, where uncertain data can arise both due to limited amount of data or due to limited excitation of the system in regions of the state space. Using a nonparametric approach gives more flexibility, since the determined contact force friction relation is not tied to a specific model.

To this end, some embodiments first determine a probability distribution over possible functions of the friction between the road and the tire, and second determines a specific function from said probability distribution. Doing in such a manner ensures that the determined tire to road contact friction relation adheres to the uncertainties stemming from the available data, and that the uncertainty of the specific function from said probability distribution can be quantified. This can be advantageous, e.g., in ADAS vehicle control where the vehicle controller can exploit a large uncertainty of the friction for particular ranges of slip values to minimize risk of unwanted behavior in the vehicle control.

Some embodiments are based on the recognition that the motion of the vehicle is dependent on the tire friction function describing the tire to road contact friction relation. Hence, it is tempting to estimate the state trajectory by simultaneously and iteratively estimating the state of the vehicle and the tire friction function, by updating the tire friction function using the estimated state trajectory and the model of motion of the vehicle. However, in order to estimate the state of the vehicle and the tire friction iteratively over consecutive time instants, two models are needed, one of the motion of the state of the vehicle and one of the motion of the tire friction. However, the time evolution of the tire friction is unknown, and any model of the tire friction is therefore unknown and cannot be verified.

Some embodiments are based on the realization that all measurements are noisy and that any model of the motion of the vehicle is a simplification of the real system. Hence, it is impractical to determine a tire friction function deterministically, e.g., just by finding the tire friction function that would fit the measurements.

Some embodiments are based on another recognition that the unknown tire friction can be regarded as a stochastic uncertainty of the model of the motion of the vehicle, to produce a model of motion with unknown friction. In addition, one embodiment recognizes that there are typically other disturbances acting on the motion of the vehicle. For instance, due to uncertainties in the actuators producing the control inputs, or other unmodeled dynamics, for instance, simplifications in the modeling of the suspension system of the tire. Another embodiment is based on the understanding that if the stochastic uncertainty caused by the unknown tire friction is the only stochastic component, all other errors, as the aforementioned, would be described by the unknown tire friction, which would cause wrong estimates of the tire friction, which can be problematic when using the determined tire friction curve for real-time control. Hence, one embodiment introduces a stochastic disturbance acting on the motion model of the vehicle, which in combination with a stochastic disturbance describing the tire friction models the complete motion of the vehicle.

Some embodiments are based on the understanding that the motion model of the vehicle includes a combination of a deterministic component of the motion and a probabilistic component of the motion. The deterministic component of the motion is independent from the tire friction and defines the motion of the vehicle as a function of time. On the other hand, the probabilistic component includes the tire friction as a probabilistic function and an additional error component having an uncertainty that act as disturbances on the motion of the vehicle. In such a manner, the motion of the vehicle can be modeled including the tire friction of the tires without knowing the model of motion of the tire friction.

The measurement model of the vehicle can also be represented to include the function describing the tire to road contact friction relation, e.g., a longitudinal acceleration, a lateral acceleration, and a rotation rate of the vehicle can be measured. Using such measurements, the unknown tire friction can at least indirectly be represented by the motion model and the measurement model. The motion and the measurements are related through a state trajectory driven by a vehicle, which should be the same up to a certain threshold if the tire friction and the stochastic disturbance are known. The variation of the difference prevents determining the tire friction, but allows determining a probability distribution of the tire friction.

Some embodiments are based on the recognition that the probabilistic tire friction does not fit into the model of the vehicle. However, some embodiments are based on the realization that it is possible to use a sample of a probability density function (PDF) of a tire friction in a joint estimation of the state and the tire friction function. Notably, the joint estimation of some embodiments updates probability distributions of the quantities, not the values of the quantities. In some embodiments, each sample on that PDF is the entire tire friction function, rather than a single value of a friction.

Some embodiments are based understanding that to update the tire friction function, a state trajectory consistent with the measurements is needed. This is because the state trajectory is dependent on the tire friction, and only by having a correct state trajectory, is it possible to determine the tire friction. However, to determine a full state trajectory, it is necessary to process a set of data spanning over a long time interval, which necessitates the need to have a constant road surface during data collection, since otherwise a state trajectory would correspond to an average of different surfaces.

Some embodiments are based on the understanding that instead of determining one single state trajectory and thereby updating the PDF of tire friction function, it is possible to determine a set of states, wherein each state corresponds to a specific PDF of tire friction function. This is because even if not a single combination of state and PDF of friction function is correct, by virtue of having many such combinations, the aggregate can still be correct.

For example, some embodiments use a particle filter maintaining a set of particles, each particle includes an estimation of a state of the vehicle, an estimation of a PDF of tire friction function, and a weight indicative of the probability of the particle. The particle filters represents allows to represent difference of states at a single point of time rather than over a period of time as with the state trajectory. In turn, such a representation allows for online estimation of both the state and the tire friction function.

For example, some embodiments update the state of the vehicle in each particle and the PDF of tire friction function of each particle, to fit with the measurement and control input according to the motion model and measurement model of the vehicle. In one embodiment, the PDF of tire friction function is determined as a weighted combination of the PDF of tire friction function in each particle. Hence, even if PDF of each particle is incorrect, the collective representation of the PDF of the tire friction function can be more accurate.

In some implementations, the PDF of the tire friction function can be regarded as a Gaussian process, i.e., a distribution over functions with a continuous domain, e.g. space, such that sample of the Gaussian process is a continuous tire friction function. Representing PDF of a tire function as a Gaussian process increase the accuracy of tire friction function estimation. However, estimating of the tire friction function according to principles of a Gaussian process is a computationally challenging task.

Some embodiments are based on realization of a manner of simplification the estimation of the Gaussian process to determine the tire friction function. Specifically, in some embodiments, a tire friction function is regarded as a weighted combination of basis functions, and Gaussian process of the tire friction function is captured by Gaussian distributions of weights of basis function. It can be shown that if the weights for each basis function are modeled as a Gaussian distribution, it has interpretation of the tire friction function modeled as a Gaussian process. In other words, to update Gaussian process some embodiments can just update these Gaussian distributions of weights, and to sample tire friction function some embodiments can just sample N scalar weights from Gaussian distribution. In effect, regarding the tire friction function as a weighted combination of basis functions decreases the computational requirements for estimating the tire friction in probabilistic manner.

One embodiment is based on the insight that several control methods already employed in production vehicles are based on a particular tire model and where the controller is tuned according to the parameters of that tire model. Consequently, one embodiment uses the determined function describing the friction between the road and the tire allowing to fit the parameters of a specific tire model to the determined function, by minimizing a cost function describing the error between the specific tire model and the non-parametric function.

Accordingly, one embodiment discloses a system for controlling a vehicle by jointly estimating a state of a vehicle and a function of a tire friction of a vehicle traveling on a road, wherein the tire friction function is a nonlinear function describing a friction between a surface of the road and a tire of the vehicle as a function of wheel slip of a wheel of the vehicle, wherein the state of the vehicle includes a velocity and a heading rate of the vehicle. The system includes a memory configured to store a particle filter maintaining a set of particles, each particle includes an estimation of a state of the vehicle, an estimation of probability density function (pdf) of the tire friction function, and a weight indicative of a probability of the particle; a processor configured to execute the particle filter to update the particles based on a motion model and a measurement model of the vehicle, control commands moving the vehicle and measurements of the state where the vehicle moved according to the control commands; and generate a control command based on the motion of the vehicle, the weighted combinations of the state of the vehicle and the pdf of the tire friction function weighted according corresponding weights of the particles; and submit the control command to at least one actuator of the vehicle.

Another embodiment discloses a method for controlling a vehicle by jointly estimating a state of a vehicle and a function of a tire friction of a vehicle traveling on a road, wherein the tire friction function is a nonlinear function describing a friction between a surface of the road and a tire of the vehicle as a function of wheel slip of a wheel of the vehicle, wherein the state of the vehicle includes a velocity and a heading rate of the vehicle, wherein the method uses a processor coupled to a memory storing a particle filter maintaining a set of particles, each particle includes an estimation of a state of the vehicle, an estimation of probability density function (pdf) of the tire friction function, and a weight indicative of a probability of the particle, wherein the processor is coupled with stored instructions implementing the method, wherein the instructions, when executed by the processor carry out steps of the method. The method includes executing the particle filter to update the particles based on a motion model and a measurement model of the vehicle, control commands moving the vehicle and measurements of the state where the vehicle moved according to the control commands; generating a control command based on the motion of the vehicle, the weighted combinations of the state of the vehicle and the pdf of the tire friction function weighted according corresponding weights of the particles; and submitting the control command to at least one actuator of the vehicle.

Yet another embodiment discloses a non-transitory computer readable storage medium embodied thereon a program executable by a processor for performing a method, the medium stores a particle filter maintaining a set of particles, each particle includes an estimation of a state of the vehicle, an estimation of probability density function (pdf) of the tire friction function, and a weight indicative of a probability of the particle, the method includes executing the particle filter to update the particles based on a motion model and a measurement model of the vehicle, control commands moving the vehicle and measurements of the state where the vehicle moved according to the control commands; generating a control command based on the motion of the vehicle, the weighted combinations of the state of the vehicle and the pdf of the tire friction function weighted according corresponding weights of the particles; and submitting the control command to at least one actuator of the vehicle.

BRIEF DESCRIPTION OF THE DRAWINGS

FIGS. 5A and 5B show schematics illustrating principles of some embodiments.

DETAILED DESCRIPTION

Figure 1A:
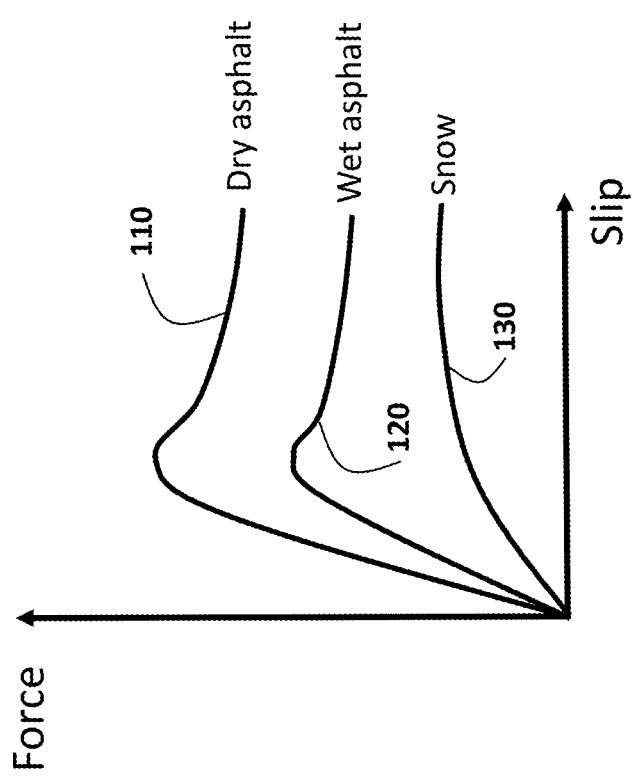
FIG. 1A shows an illustration of different tire friction functions determined by some embodiments.

FIG. 1A shows an illustration of different tire friction functions determined by some embodiments. The magnitude of the force on a tire of vehicle traveled on a road varies with the slip for different types of the surface of the road such as dry asphalt 110, wet asphalt 120, and snow 130 surfaces. The tire-force relationship is highly nonlinear and also depends on other factors, such as tire pressure, vehicle mass, tire temperature, and wear on the tire. As used herein, a vehicle can be any type of wheeled vehicle, such as a passenger car, bus, or rover.

FIG. 1A shows an exemplar situation of the tire force dependence on the slip. This is a per se method of illustrating the tire-force relationship, since slip is the dominating factor in determining the tire force. FIG. 1A can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 1A can illustrate the lateral force, in which case the slip is defined in terms of a ratio between the wheel's lateral and longitudinal velocity components.

FIG. 1A shows the situation when only one of the slip quantities are nonzero at the same time. In general, for example, when a driver of a vehicle is braking while also turning, both longitudinal and lateral slips are nonzero. Depending on the particular tire model used, the force-slip relation can vary.

Figure 1B:
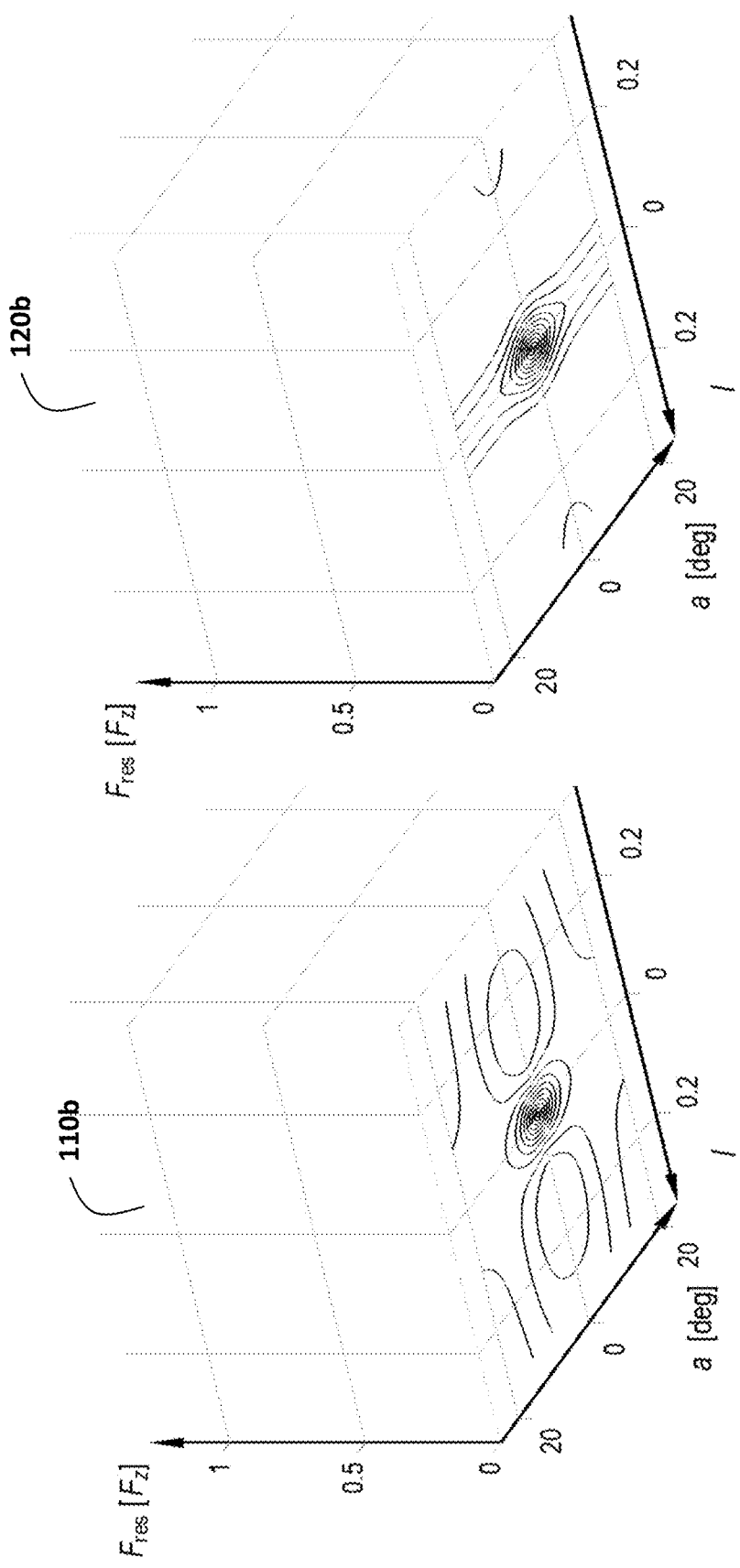
FIG. 1B shows a schematic of how the force of a tire of vehicle varies when the values of the slip vary, in both longitudinal and lateral direction used by some embodiments.

FIG. 1B shows a schematic of how the force of a tire of vehicle varies when the values of the slip vary, in both longitudinal and lateral direction used by some embodiments. The situation shows the results for two different tire friction functions 110b and 120b. In the remainder of this disclosure, one of either the longitudinal and lateral slip is zero for simplicity, but it is to be understood, and as a reader with experience within the field will appreciate, various embodiments described herein also cover the case for combined slip.

Figure 1C:
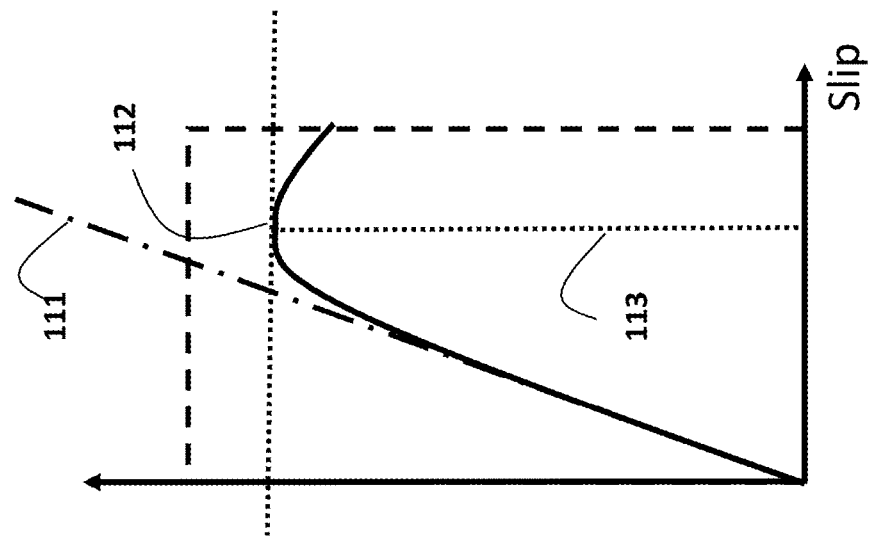
FIG. 1C shows a zoomed-in version of FIG. 1A, where the force has been normalized with the normal force resting on the wheel, where the case of dry asphalt 110 is considered in more detail.
Figure 1C:
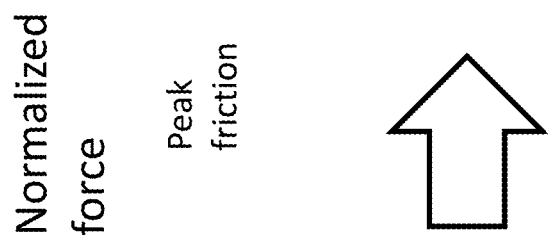
Figure 1C:
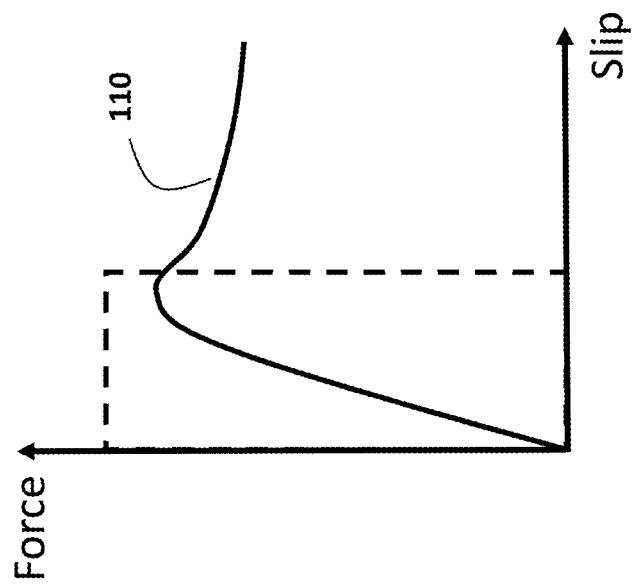

FIG. 1C shows a zoomed-in version of FIG. 1A, where the force has been normalized with the normal force resting on the wheel, where the case of dry asphalt 110 is considered in more detail. The value 113 where the force attains its maximum is called the peak friction 112. The peak friction 112 is useful to know in several automotive control systems. For example, the knowledge of peak friction is important in order to know how much brake torque that can be applied to a particular wheel in electronic stability control systems (ESCs). The peak friction value and the corresponding slip value 113 can be used in anti-lock braking systems (ABS) to achieve optimal braking force. The initial slope 111 of the force curve 110 is usually called the stiffness of the tire. During normal driving, in which case the slip is small, the force curve can be approximated with the tire stiffness 111. As used herein, the normal driving is defined as regular driving, e.g., everyday driving in urban areas, where the vehicle avoids emergency braking and evasive steering maneuvers.

The normal driving can be contrasted with aggressive driving when extensive force is applied on the wheels of the vehicle. As used herein, the aggressive driving is defined as driving where braking/acceleration and/or steering torque is large enough such that the vehicle operates close to the tire adhesion limits of material of the tires and the surface of the road. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems measure a deviation from a predicted measurement, using a steering wheel angle and a longitudinal velocity, to a vehicle model using the tire force function as a linear approximation. When the deviation is more than a threshold, safety braking is activated. Thus, one exemplar measure of normal driving is driving well below these activation thresholds. In other words, if the driving is not aggressive, the driving is normal.

During the aggressive driving the wheel slips more, which causes a larger force/friction variation. This variation is highly non-linear. For example, regardless of the extent of the force and type of the road, there is a maximum friction for almost all surfaces, which occurs at a point from which the force decreases when applying more braking/steering torque. After this point the increase in wheel slip results in smaller tire forces. For large wheel slip beyond the maximum force it becomes more difficult to maintain a desired wheel slip, since the dynamics becomes unstable beyond the point of maximum force. Therefore, vehicles are often controlled such that the wheel slip stays small enough such that the peak is not exceeded, and for high-performance maneuvering it is therefore essential to know where 111 the peak 112 is attained.

For a deterministic real-time determination of the tire friction function, which is nonlinear for large slip values, data need to be collected on the entire tire friction function over a short time period. This is challenging because it requires driving at/close to the unstable region of the vehicle dynamics. The whole operating region is typically not visited during normal vehicle driving, and it may be dangerous to visit this part of the dynamics with either a controller that has not yet acquired a good prediction model for the vehicle behavior or knows that the uncertainty of the tire friction at such operating regions, as closed-loop instability may occur.

Some embodiments are based on the understanding that while it is not impractical to determine the tire friction curve in its entirety during real-time operation, it is possible to determine a probability density function (PDF) of the tire friction curve in its entirety during real-time operation, wherein the PDF captures eventual uncertainty of the absence of data collection for certain slip values.

Another embodiment is based on the understanding that using a probabilistic approach, a controller of the vehicle, either autonomous or manual, can use the information to either explore the uncertain region to gain more knowledge and hence reduce uncertainty, or, avoid that region since the uncertainty causes a risk to explore.

One embodiment is based on the realization that even though production vehicles do not have the sensor equipment to measure the tire friction function directly, several of the sensors in production vehicles give indirect information about the tire friction function because they measure a vehicle state or combinations of a vehicle state. As used herein, a vehicle state includes a velocity of the vehicle and a heading rate of the vehicle. For instance, an inertial measurement unit measures a heading rate of the vehicle and an acceleration of the vehicle. Hence, an inertial sensor measures directly parts of the vehicle state. On the other hand, an acceleration sensor measures an acceleration of the vehicle, which is related to both the vehicle velocity and the tire friction function by Newton's second law. For instance, a wheel speed sensor of a vehicle gives an indication of the forward velocity of the vehicle, which can be a vehicle state.

Another embodiment recognizes the fact that although the measurements give valuable information, either about the vehicle state as for a wheel speed sensor, which in its turn provides valuable information for determining the tire friction function, or about the tire friction function as for an acceleration sensor, the measurements are subject to noise. For instance, noise due to mechanical vibrations of the placement of the sensor, or due to inherent measurement noise due to the electronics inside the sensor.

Further embodiments are based on recognition that estimation of a tire friction function during real-time operation of the vehicle is sensitive to disturbances and to specifics of the road which is driven. Using a probabilistic approach for the tire friction determination, it is possible to capture the uncertainties, not only in sensor data but also in specifics of a particular road along on which the vehicle is traveling. Indeed, using a probabilistic approach gives the possibility to capture uncertainties in data, where uncertain data can arise both due to limited amount of data or due to limited excitation of the system in regions of the state space.

Some embodiments are based on the recognition that the motion of the vehicle is dependent on the tire friction function describing the tire to road contact friction relation. Hence, it is tempting to estimate the state trajectory by simultaneously and iteratively estimating the state of the vehicle and the tire friction function, by updating the tire friction function using the estimated state trajectory and the model of motion of the vehicle. However, in order to estimate the state of the vehicle and the tire friction iteratively over consecutive time instants, two models are needed, one of the motion of the state of the vehicle and one of the motion of the tire friction. However, the time evolution of the tire friction is unknown, and any model of the tire friction is therefore unknown and cannot be verified.

Other embodiments are based on the fact that to update the tire friction function, a state trajectory consistent with the measurements is needed. This is because the state trajectory is dependent on the tire friction, and only by having a correct state trajectory, is it possible to determine the tire friction.

Some embodiments are based on understanding that to determine a full state trajectory, it is necessary to process a set of data spanning over a long time interval. However, doing so necessitates the need to have a constant road surface during data collection, since otherwise a state trajectory would correspond to an average of different surfaces. To that end, the embodiments, instead of determining one single state trajectory and thereby updating the PDF of tire friction function, determine a set of states, wherein each state corresponds to a specific PDF of tire friction function. This is because even if not a single combination of state and PDF of friction function is correct, by virtue of having many such combinations, the aggregate can still be correct.

In one embodiment, the set of states and corresponding PDF of tire friction together with a weight indicating the probability of such combination, form a particle for each combination of state and PDF.

Some other embodiments are based on the realization that because the sensor data and model of motion are uncertain, determining the tire friction function should not be done deterministically by taking a difference, or by finding the tire friction function that would fit the measurements.

Some embodiments are based on the realization that the unknown tire friction can be regarded as a stochastic uncertainty of the model of the motion of the vehicle, to produce a model of motion with unknown friction. In addition, one embodiment recognizes that there are typically other disturbances acting on the motion of the vehicle. For instance, due to uncertainties in the actuators producing the control inputs, or other unmodeled dynamics, for instance, simplifications in the modeling of the suspension system of the tire. Another embodiment is based on the understanding that if the stochastic uncertainty caused by the unknown tire friction is the only stochastic component, all other errors, as the aforementioned, would be described by the unknown tire friction, which may reduce accuracy of estimates of the tire friction. Hence, one embodiment introduces a stochastic disturbance acting on the motion model of the vehicle, which in combination with a stochastic disturbance describing the tire friction models the complete motion of the vehicle.

Some embodiments are based on the understanding that the motion model of the vehicle includes a combination of a deterministic component of the motion and a probabilistic component of the motion. The deterministic component of the motion is independent from the tire friction and defines the motion of the vehicle as a function of time. On the other hand, the probabilistic component includes the tire friction as a probabilistic function and an additional error component having an uncertainty that act as disturbances on the motion of the vehicle. In such a manner, the motion of the vehicle can be modeled including the tire friction of the tires without knowing the model of motion of the tire friction.

The measurement model of the vehicle can also be represented to include the function describing the tire to road contact friction relation, e.g., a longitudinal acceleration, a lateral acceleration, and a rotation rate of the vehicle can be measured. Using such measurements, the unknown tire friction can at least indirectly be represented by the motion model and the measurement model. The motion and the measurements are related through a state trajectory driven by a vehicle, which should be the same up to a certain threshold if the tire friction and the stochastic disturbance are known. The variation of the difference prevents determining the tire friction, but allows determining a probability distribution of the tire friction.

Some embodiments are based on the realization that it is possible to update a current state from a previous state, wherein the feasible space of current states is defined by the motion model of the vehicle including the PDF of the tire friction function and the stochastic disturbance, and use the sampled quantities in a joint estimation of the state, the tire friction, and the variance of the stochastic disturbance. Notably, the joint estimation of some embodiments updates probability distributions of the tire friction function, not the tire friction function. Instead, the tire friction function is an output, or aggregate, from the probability distribution of tire friction function.

Figure 1D:
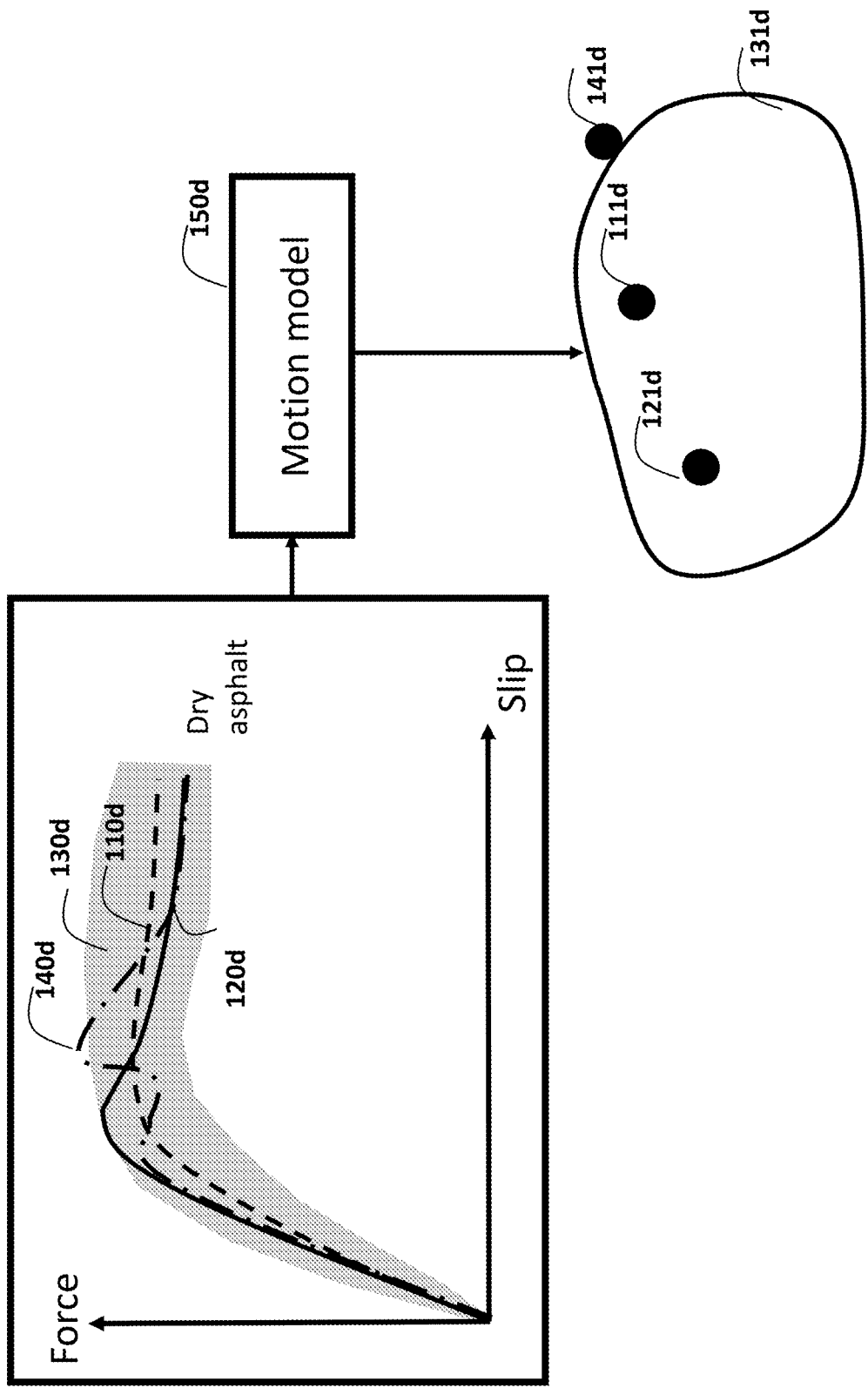
FIG. 1D shows a schematic of a sampling from a feasible space of the tire friction function determined by a probability density function (PDF) of a tire friction function according to some embodiments.

FIG. 1D shows a schematic of updating a current state, wherein the feasible space is determined by the motion model and the tire friction function determined by a PDF of a tire friction function according to some embodiments. In FIG. 1D, each sample of the current state represents a sample defined by the PDF of the tire friction function. For instance, the feasible space 131d of current states is determined from the values of the PDF 130d of the tire friction function at each point in space in combination with the motion model 150d. In FIG. 1D, two possible current states 111d and 121d are defined by two corresponding tire friction function samples 110d and 120d, and those two current states are feasible, since they have a finite, nonzero probability of being sampled. However, sample 141d is unlikely to be sampled, because it is not contained in the feasible space 141d in its entirety, and the unlikely sample 131d corresponds to an unlikely sample 140d of tire friction function. In other words, there is a correspondence between a possible tire friction function and state trajectory. Some embodiments utilize this recognition to generate current states by sampling from the disturbance acting on the motion model 150d.

Figure 1E:
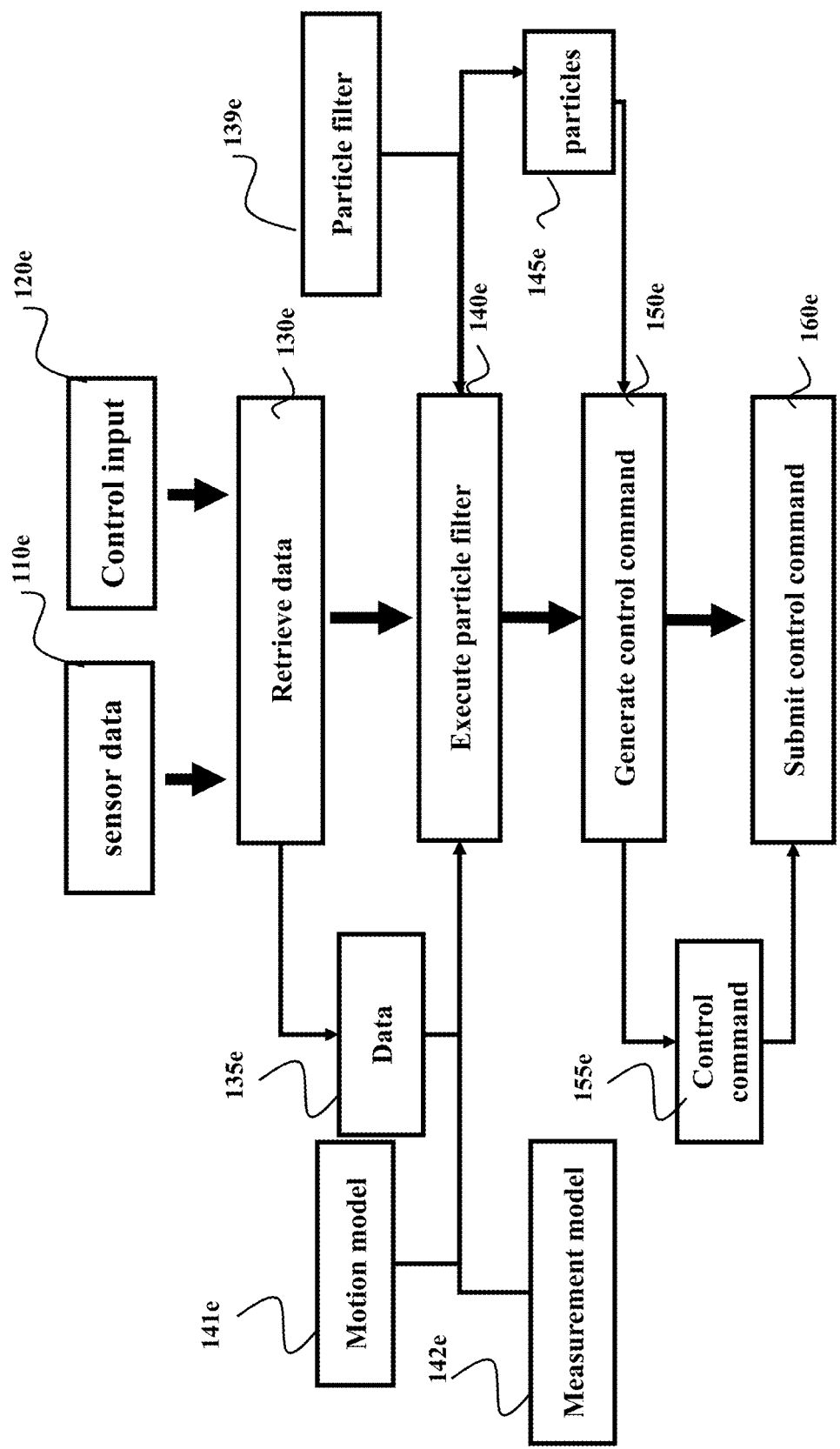
FIG. 1E shows a flowchart of one iteration of a method for controlling a vehicle by jointly estimating a state of a vehicle, e.g., a velocity and a heading rate of the vehicle, and a function of a tire friction of a vehicle traveling on a road.

FIG. 1E shows a flowchart of one iteration of a method for controlling a vehicle by jointly estimating a state of a vehicle, e.g., a velocity and a heading rate of the vehicle, and a function of a tire friction of a vehicle traveling on a road according to some embodiments. The method updates a PDF of the tire friction function. The tire friction is a nonlinear function describing a friction between a surface of the road and a tire of the vehicle as a function of slippage of a wheel of the vehicle. The PDF of the tire friction function is a PDF determining the probability density over the possible space of tire friction functions. The method regards the unknown tire friction function as a disturbance on an otherwise deterministic model of a motion of a vehicle. The uncertainty in tire friction, i.e., the stochastic disturbance, causes the vehicle to have different possible motions and therefore also different possible states.

To that end, the method receives control inputs 110e and sensor data 120e, wherein the control inputs are used to operate the vehicle in real time, wherein the control inputs can be generated by a human operator of the vehicle or a controller of the vehicle when the vehicle is operating in autonomous mode. The sensor data 120e are sensor measurements measuring the behavior of the vehicle in response to the control inputs 110e. The method retrieves 130e the motion data, motion model 141e, measurement model 142e, and executes 140e a particle filter to update the particles 145e in response to the measurement of the state where the vehicle moves according to the control command. Next, the method generates a control command based on the motion of the vehicle, the weighted combination of the state of the vehicle, and the PDF of tire friction function provided in the particles. Finally, the method submits 160e the control command 155e to at least one actuator of the vehicle.

The PDF of the tire friction function is updated to increase a probability of the updated vehicle states in the particles, and therefore also the tire friction function. For example, in one implementation the method samples the PDF of the tire friction function, updates a state of the vehicle to fit the measurement with the measurement model and the control input according to the motion model including the sample of the tire friction function, and update the probability distribution of the tire friction function and vehicle state based on the state and measurement of the vehicle. In another implementation, the method instead samples the stochastic disturbance according to the PDF of the disturbance, determines a state of the vehicle to fit the measurement with the measurement model and the control input according to the motion model including the mean of the PDF of the tire friction function and vehicle state based on the state and measurement of the vehicle.

Notably, the method updates the PDF of the tire friction function rather than the friction function itself. In effect, such a probabilistic update allows considering stochastic uncertainties of the tire friction determination from measurements collected from commonly used sensors. In addition, such a probabilistic update allows estimating the tire friction function without using a specific tire model. This, in turn, allows fitting the parameters of a specific tire model to the updated PDF of the tire friction function, which allows to adapt the tire friction estimation performed by various embodiments to different methods of motion control of the vehicle.

Figure 1F:
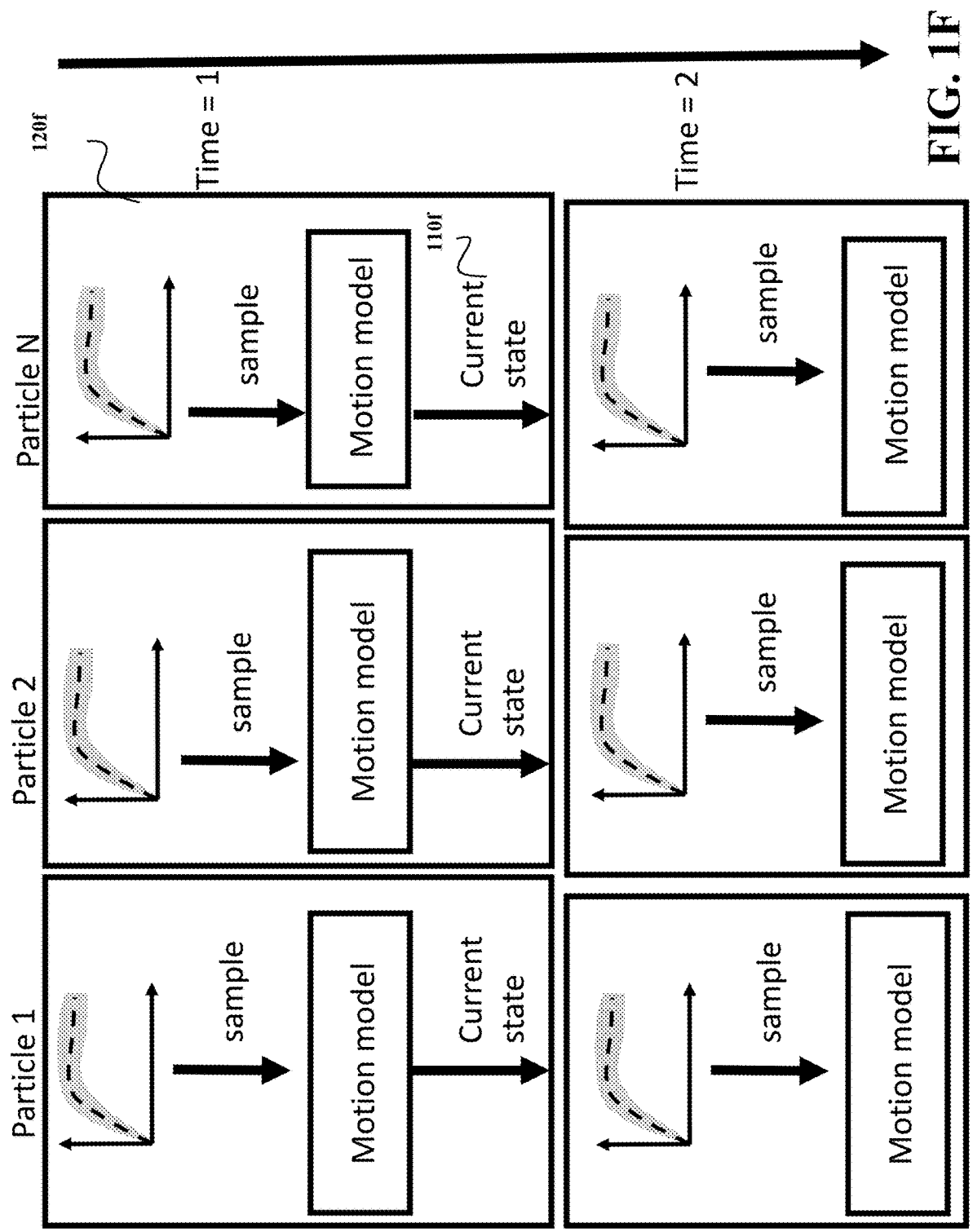
FIG. 1F illustrates how each sample at each time step of control is associated with its own belief of a PDF of a tire friction function according to some embodiments.

FIG. 1F illustrates how each sample at each time step of control is associated with its own belief of a PDF of a tire friction function according to some embodiments. For each time step of control, using the PDF of tire friction function determined at a previous time step, a sample is generated and used to determine a current, updated, state 110f. Since the state is updated probabilistically subject to noise, each different updated state will lead to a different updated PDF of tire friction function. Hence, each PDF of tire friction function is associated with an updated state, i.e., multiple sets 120f of PDFs of tire friction function are updated and an aggregate is determined as an output.

Figure 1G:
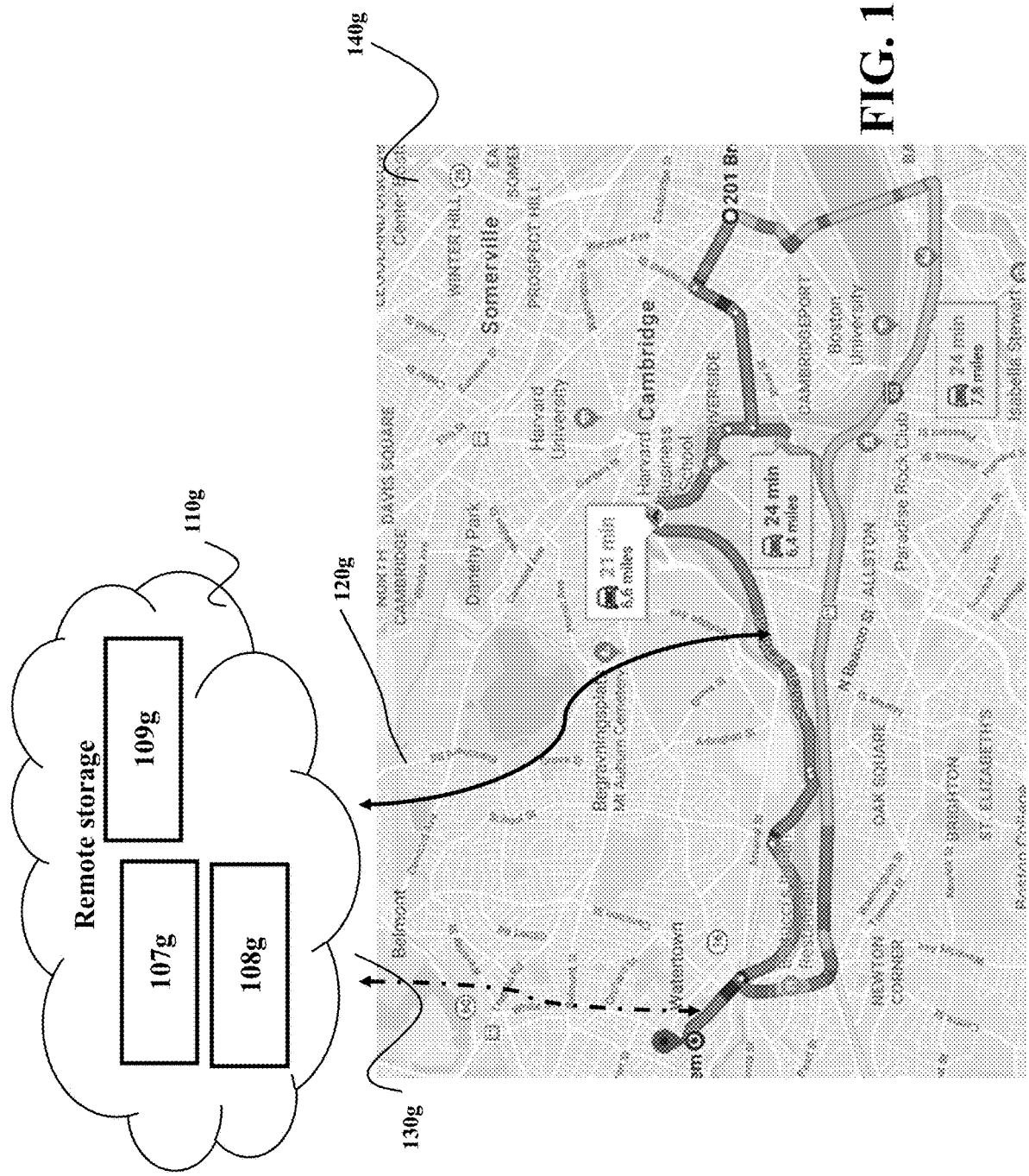
FIG. 1G shows a schematic of storing the PDF of tire friction function and data 109g indicative of the nature of the determining the PDF according to some embodiments.

FIG. 1G shows a schematic of storing the PDF 107g of tire friction function 108g and data 109g indicative of the nature of the determining the PDF 107g according to some embodiments. For instance, data 109g can indicate a time of which day the PDF was determined, a position of the collected data. For instance, the PDF 107g is indicative of a vehicle located at the arrow 120g. This can be used by another vehicle indicated by the arrow 130g, either to determine another route to its goal since it intersects with the position of the vehicle of PDF 107g.

Several embodiments utilize the fact that the tire friction function and the control inputs are related to each other by the forces of the tire. In fact, the tire force is obtained from the tire friction by a scaling as a function of the vehicle mass and gravity. In one embodiment, the control inputs include commands specifying values of one or combination of a steering angle of the wheels of the vehicle and a rotational velocity of the wheels. The steering angle of the wheel affects the forces 110b 120b that can be generated in either direction of the wheel. For example, if the steering angle of the wheel is zero the vehicle is moving along a line and the forces are directed in one direction. However, if a nonzero steering angle is enforced, the force is divided into a longitudinal component and a lateral component, which affects how the tire friction function can be determined.

Some embodiments determine the PDF of the tire friction function to increase a probability of determining a current state that reconciles the differences between the motion model and measurement models in state estimation of the vehicle. The tire friction function is dependent on the vehicle state through the motion model of the vehicle that relates the vehicle state to the tire friction. The measurements may or may not include the tire friction function directly, but are indicative of the vehicle states with noise. Hence, the state determined using the motion model and the state determined using the measurement model can be compared, because the state determined using the motion model including the tire friction function is indicative of the quality of the PDF of tire friction function when compared to the measurements. Due to the presence of noise, it is more reliable to compare trajectories of the states, rather than individual states. However, in a real-time operation sensor measurements are collected recursively for each time step of control. Hence, comparing trajectories of states can be done by comparing individual states, wherein the comparing the individual states includes a component that weighs in previous comparisons of individual states. Such a comparison reduces uncertainties of the comparison indicative of the tire friction function, since the comparison is not done sample by sample, but over a longer time span including multiple states for consecutive time steps of control.

Figure 1H:
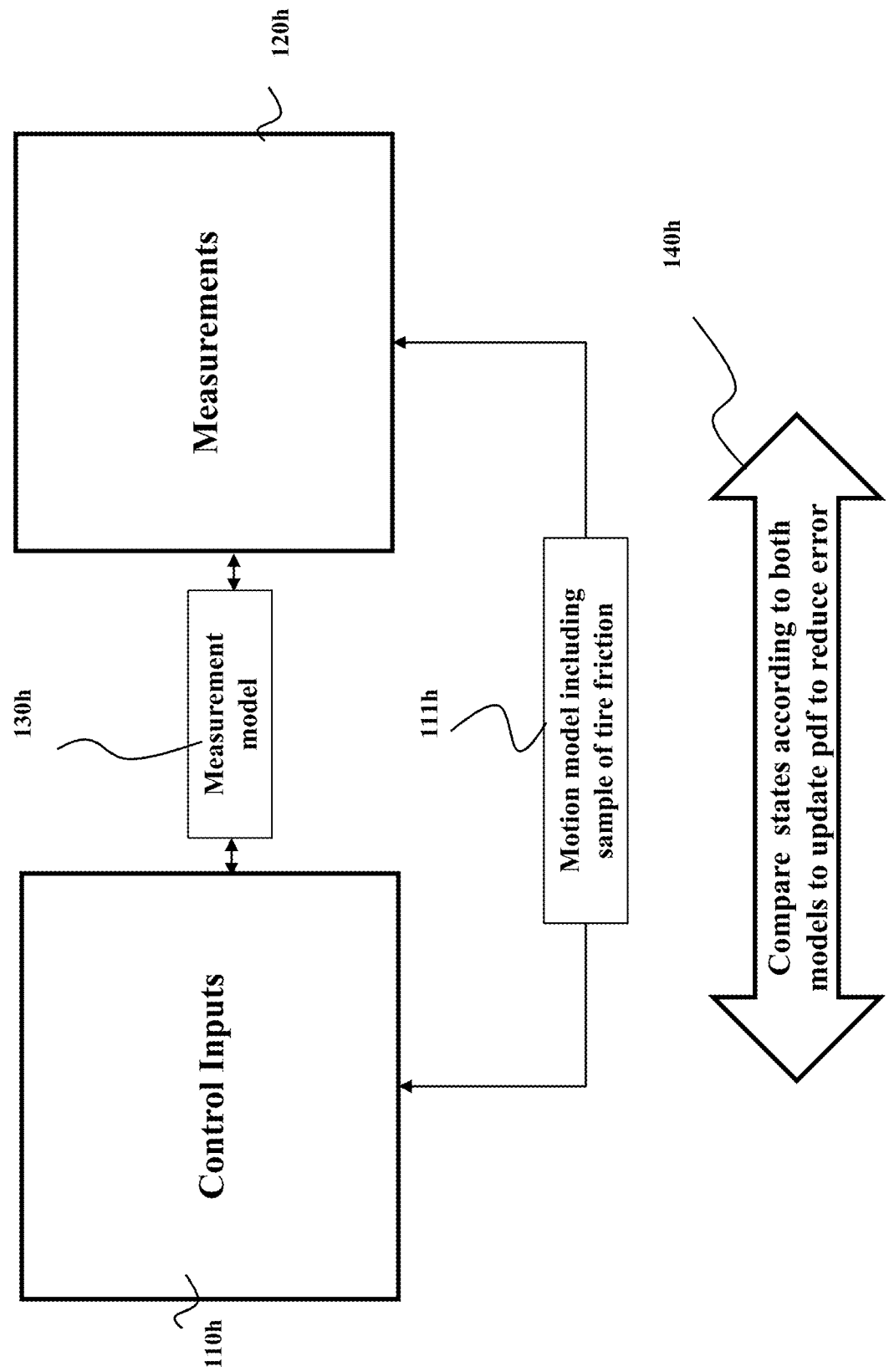
FIG. 1H shows a schematic of a method of using states of a vehicle to update the PDF of tire friction function according to some embodiments.

FIG. 1H shows a schematic of a method of using states of a vehicle to update the PDF of tire friction function according to some embodiments. The embodiments determine a state of the vehicle that for each time step of control fits the measurement 120h according to the measurement model 130h and the control input 110h according to the motion model 111h including the sample of the tire friction function. In other words, the embodiments compare 140h states of the vehicle determined according to both models to update PDF of the tire friction function to reduce error of difference in the estimations. For example, by comparing a state determined using a motion model including a sampled tire friction and a sampled process noise, with a state determined using a measurement model, it is possible to update the PDF of tire friction function to improve the sample of tire friction function to fit both the control inputs 110h and the measurements 120h. In some implementations, such a comparison is performed probabilistically to consider noise and model errors acting on one or combination of the motion model and the measurement model.

One embodiment uses measurements that include values of one or combination of a rotation rate of the vehicle and an acceleration of the vehicle, which means that the corresponding measurement model have a component dependent on the tire friction, i.e., the rotation rate, and one component independent of the tire friction, i.e., the acceleration. Thus, one embodiment utilizes the fact that information about the tire friction is contained directly in the measurement sequence. The state and/or state trajectories can be composed in several ways. In one embodiment, the state trajectory includes a sequence of states, each state includes a velocity and a heading rate of the vehicle, such that the motion models the value of the control inputs to a first value of the state of the vehicle through dynamics of the vehicle at consecutive time steps, and the measurement model relates the value of the measurement to a second value of the state of the vehicle at the same time step.

Even though not described in detail here, it is straightforward to add additional states into the motion model of the vehicle, such as roll angle of the vehicle and pitch angle of the vehicle. It is also possible to extend the vehicle state with states of the environments such as inclination angle of the road and bank angle of the road. Such additions complicate the estimation problem in the sense that it becomes more computationally complex, but it is well understood from the state pf the art how to add such states to model nonplanar roads. For instance, to model the inclination angle of the road it is reasonable to assume smooth changes of the inclination angle, which would add the inclination angle, the rate of the inclination angle, and the differentiation of the rate of the inclination angle.

Figure 1I:
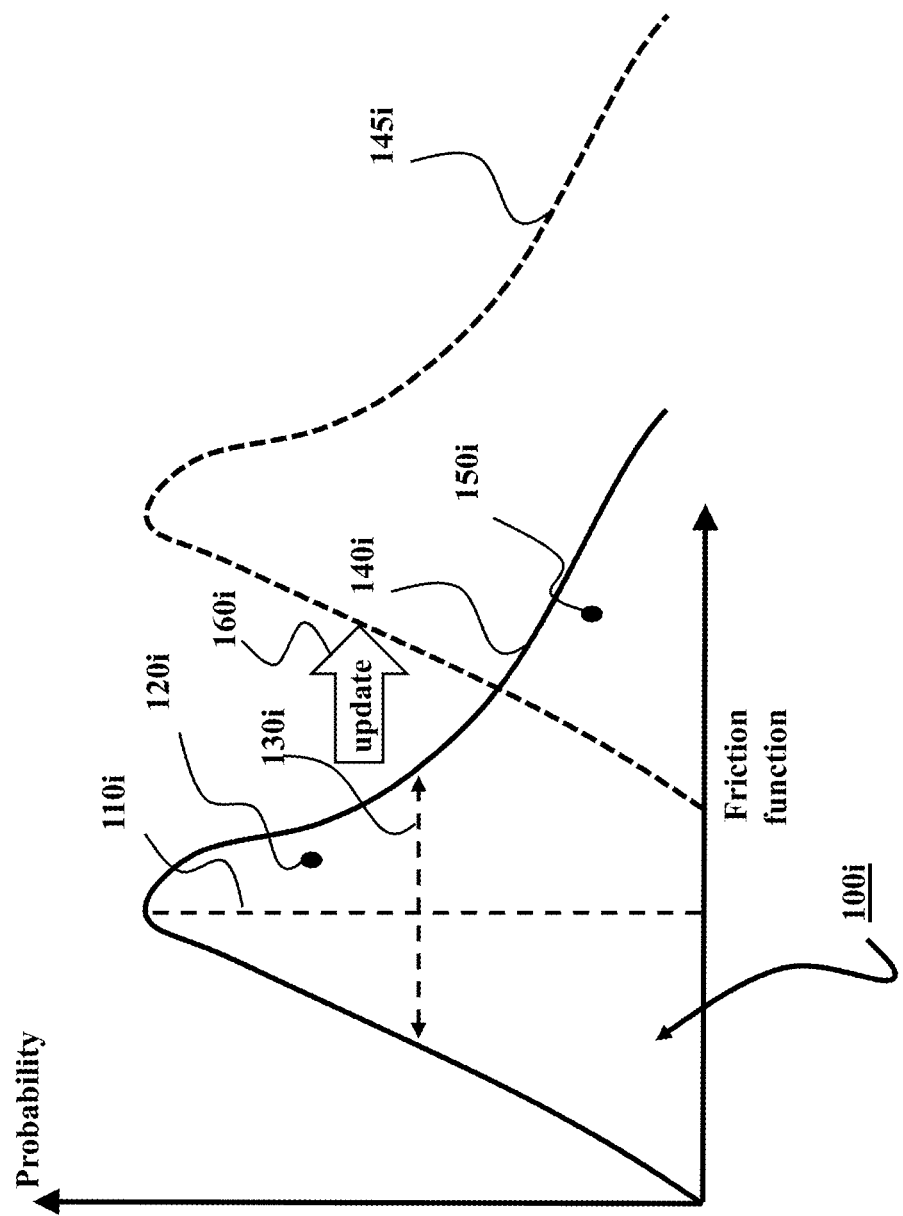
FIG. 1I shows a graph illustrating probability distribution function defining the feasible space of the tire friction function according to one embodiment.

FIG. 1I shows a graph illustrating probability distribution function 140i defining the feasible space 100i of the tire friction function according to one embodiment. The shape of the function 140i is updated in every iteration of the method 140e. For example, if the distribution of the tire friction function is Gaussian for each value of the wheel slip, the shape of the distribution 140i is the "Gaussian hat" shape for each value of wheel slip, and the tire friction function is a Gaussian distributed function, i.e., a Gaussian process. As used herein, sampling the values of the tire friction function is drawing the values with probabilities defined by the distribution 140i. For example, according to the distribution 140i, the probability of a sample 120i to be drawn or sampled is higher than the probability of the sample 150i. Such a representation allows iteratively updating 160i the probability distribution of the tire friction function to produce an updated distribution 145i defining updated feasible space for sampling tire friction function in the next.

Some embodiments are based on the realization that the unknown tire friction can be regarded as a stochastic uncertainty of the model of the motion of the vehicle, to produce a model of motion with unknown friction. Additionally, or alternatively, another embodiment recognizes that there are typically other disturbances acting on the motion of the vehicle other than the uncertainty in tire friction. Those other disturbances can be, for instance, due to uncertainties in the actuators producing the control inputs, or other unmodeled dynamics, such as simplifications in the modeling of the suspension system of the tire.

Another embodiment is based on the understanding that if the stochastic uncertainty caused by the unknown tire friction is the only stochastic component, all other errors, as the aforementioned, would be described by the unknown tire friction, which would cause wrong estimates of the tire friction. For instance, if a planar vehicle model is used and the springs of the suspension system affects the acceleration, adding a process noise can ensure that the effects of the suspension system to the acceleration measurements is attributed to an external disturbance and not the PDF of tire friction function. Hence, one embodiment introduces a stochastic disturbance, the process noise, acting on one or combination of the motion model and the measurement model of the vehicle, which in combination with a stochastic disturbance describing the tire friction defines the complete motion of the vehicle.

For instance, in one embodiment, the probability distribution of the process noise is modeled as a Gaussian distribution defined by its mean and variance, where the process noise is introduced to model effects not captured by the tire friction function.

In some embodiments, for determining the sampled current state the mean of the PDF of tire friction function is inserted into the motion model and the sampling is done from the process noise distribution, which when inserted into the motion model leads to a sampled current state. For instance, if the process is Gaussian, the mean and variance describes the Gaussian process noise and sampling from such distribution is straightforward. Referring to FIG. 1F, in other embodiments, multiple samples from the process noise are generated and each such sample is associated with its own belief of the PDF of tire friction function, motion model, and current state. In other words, a set of particles including the process noise are generated and each such sample is associated with its own belief of the PDF of tire friction function, motion model, are propagated forward in time to update the PDF of tire friction function. Doing in such a manner ensures that non-Gaussian PDFS of tire friction functions can be determined appropriately, which makes it possible to evaluate the PDF of tire friction function in highly uncertain scenarios.

For example, some embodiments, after sampling the process noise and additionally or alternatively the tire friction determine the PDF of the tire friction function using probabilistic filters, such as a Kalman filter and a particle filter to determine the state that fit both the control input and the measurement according to the motion model and measurement model that are subject to noise.

Figure 2A:
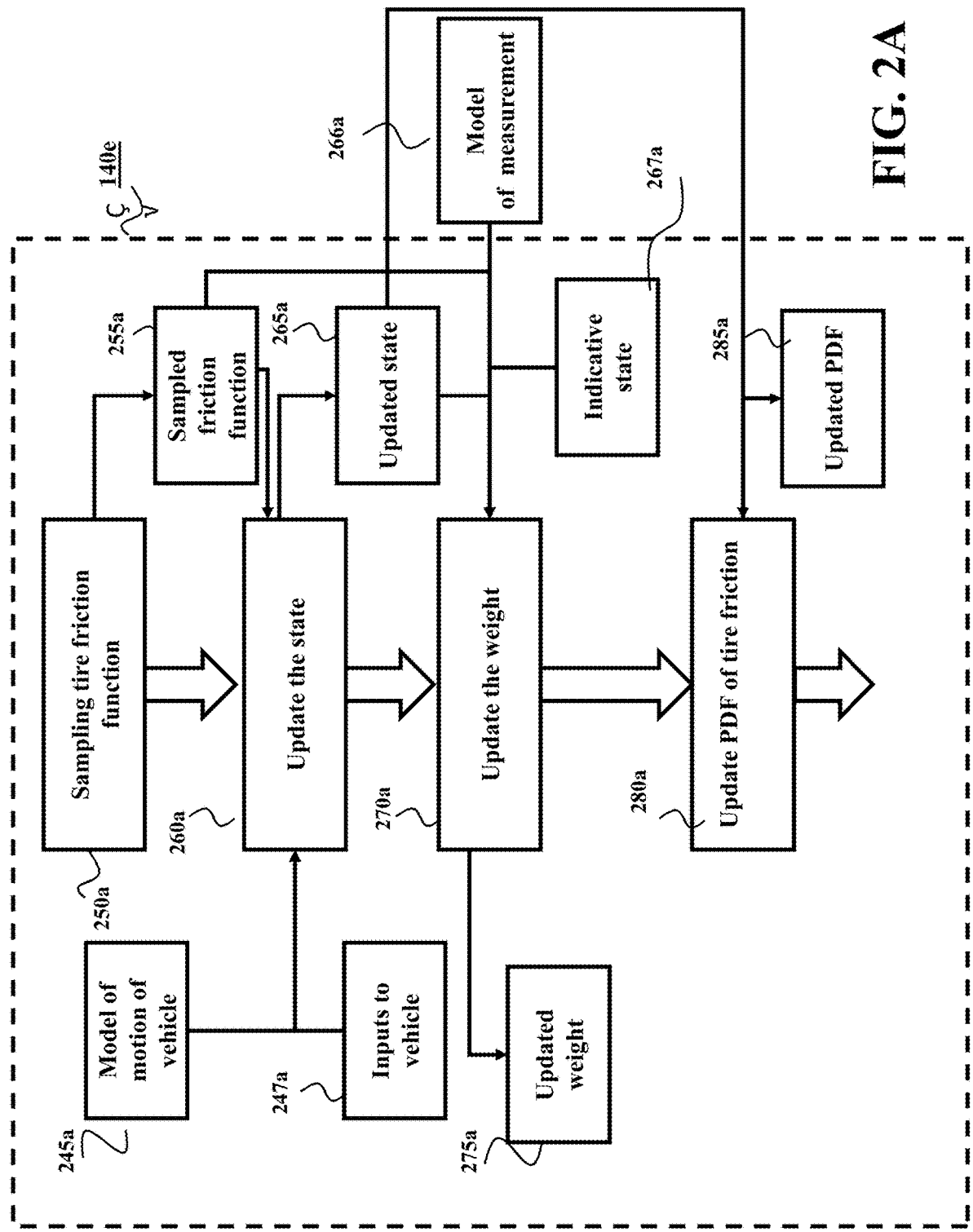
FIG. 2A shows a block diagram of a method for updating the particles in the particle filter.

FIG. 2A shows a block diagram of a method for updating the particles in the particle filter 140e. This embodiment updates the particle in the particle filter in response to the measurement to fit the particles to the measurements. The method commences with sampling 250a the tire friction function from the PDF of tire friction function in the particle, to produce a sampled 255a tire friction function. For instance, in one implementation the sample is the mean of the distribution determined during a previous iteration. Then, using the sampled tire friction, the model 245a of motion of the vehicle, the control input 247a to the vehicle, the method updates 260a the state to produce an updated state 265a. Using the updated state 265a, the model 266a of measurement and the measurement, i.e., indicative state, 267a at the current time step of control, the method updates 270a the weight of the particle to reduce an error between the state and indicative state. Next, the method updates 280a the PDF of tire friction function 285a.

In some embodiments, the motion model of the vehicle is a nonlinear function of the vehicle state on the form $x_{t+1}=a(x_t, u_t)+G(x_t, u_t)\mu(s_t)$, where $x_t$ is the state, $u_t$ is the control input, $a(x_t, u_t)+G(x_t, u_t)$ is the deterministic, known part of the motion model, and $\mu(s_t)$ is the tire friction function that is dependent on the wheel slip $s_t$ that is a function of the vehicle state. In some embodiments, the motion model includes an additive process noise $w_k$ as Gaussian distributed $w_k \sim \mathcal{N}(0, Q_k)$. Using the measurement model
$y_t = h(x_t, u_t) + D(x_t, u_t)\mu(s_t) + e_t$, where $h(x_t, u_t) + D(x_t, u_t)$ is the known part and $e_t$ is the stochastic measurement noise One embodiment generates a sample of a process noise of each particle for the control input and the measurement, wherein each sample of the process noise corresponds to a particle having its own belief of the tire friction and previous state. At each time step of control corresponding to the time steps of the control inputs and measurements, one embodiment samples from the process noise one or a multiple of samples the process-noise distribution and used as an additional component in the motion model. That is, multiple samples are drawn of the process noise, wherein each sample of process noise is associated with a sample of a tire friction function. Hence, each control input leads to a slightly different trajectory, i.e., a slightly different state. Hence, difference to the indicative state determined from the measurement will be different according to the different sampled process noise. Each sample of the process noise in combination with the same sample of the tire friction function forms a particle used to evaluate probabilistically the fitting between the control input and the measurement.

Figure 2B:
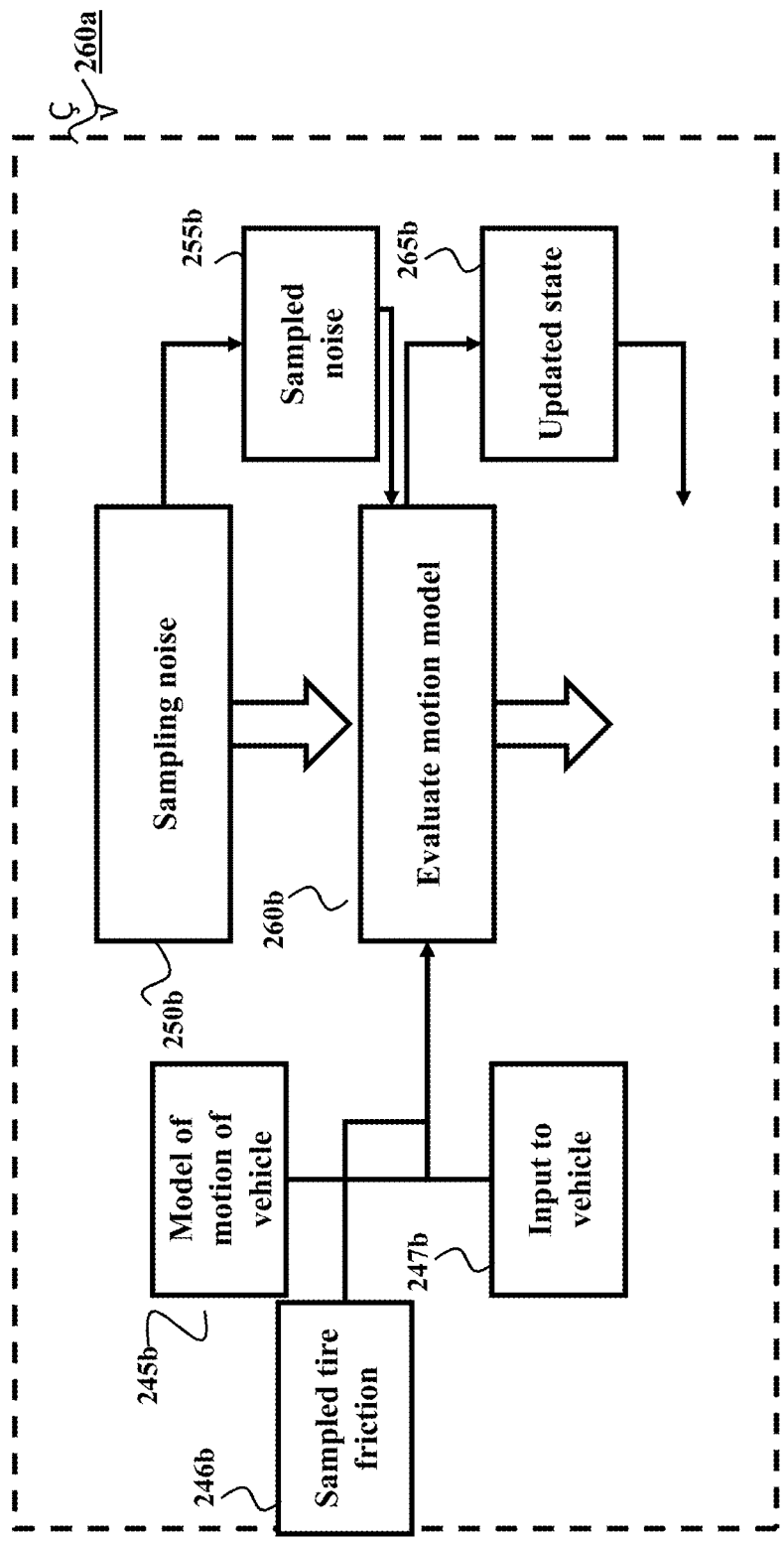
FIG. 2B shows a block diagram of a method for updating the state of the particle according to some embodiments.

FIG. 2B shows a block diagram of a method for updating 260a the state of the particle according to some embodiments. The method updates 260a the state probabilistically. The method samples 250b the process noise 255b. Next, the method inserts the process noise 255b, sampled tire friction function 246b, and control input 247b into the model of motion of the vehicle 245b, and evaluate 260b the motion model at the value of the previous state, to produce an updated state 265b of the vehicle. The model 245b of the motion of the vehicle includes an uncertainty on the motion of the vehicle due to the uncertainty in tire friction and an uncertainty on the motion of the vehicle due to the process noise, which combined is the disturbance of the vehicle, and each particle corresponds to a sample of the noise. The determining of the particles is done for each step of the control and measurement, thus forming a trajectory of particles representing a state trajectory of the vehicle. A particle includes a PDF of tire friction function, a PDF of process noise, a state of the vehicle, and a weight indicating the quality of the particle.

Updating the state of the particle can be done in several ways. When used in a particle filter, the updated state can either use sampling from a process noise that incorporates the information of the measurement, or it can be updated solely based on the information about the process noise without incorporating the measurement, since the information in such a scenario implicitly determines the update of the PDF of the tire friction for each particle. For example, when multiple particles are generated by sampling a process noise according to FIG. 2B, each particle will be assigned a weight according to how well it fits with the measurement. Hence, even if the updated state is not explicitly updated using the measurement, the measurement will be used when assigning importance weights of the different particles, and, therefore, determine which particles will be used for updating the PDF of tire friction when aggregating the particles according to the weights.

Some embodiments are based on the recognition that it is beneficial for implementation purposes to consider sampling the process noise without using the information from measurements explicitly. Other embodiments are based on the understanding that even if the updated state does not have to incorporate measurement information, it can be beneficial for improving performance of the determining the PDF of tire friction, as samples are generated with more information.

Figure 2C:
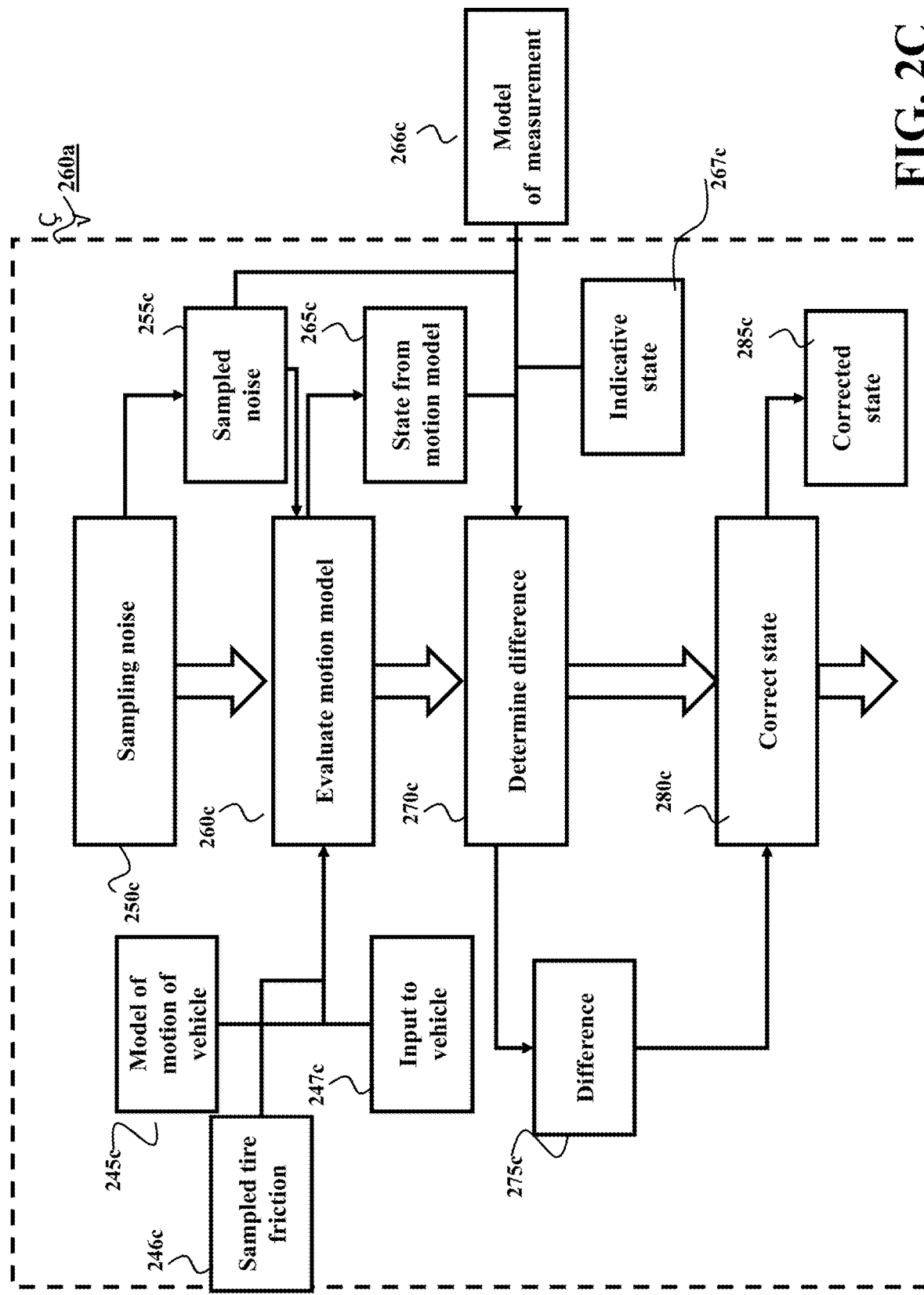
FIG. 2C shows a block diagram of another method for updating 260a the state of the particle according to some embodiments.

FIG. 2C shows a block diagram of another method for updating 260a the state of the particle according to some embodiments, wherein the measurements are explicitly incorporated in the update of the state in each particle. The method updates 260a the state probabilistically. The method samples 250c a process noise 255c. Next, the method inserts the process noise 255c, sampled tire friction function 246c, and control input 247c into the model of motion of the vehicle 245c, and evaluates 260c the motion model at the value of the previous state, to produce an updated state 265c from the motion model of the vehicle. Next, the method inserts the state 265c resulting from the motion model in to the measurement model 266c, and determines 270c a difference of the estimated state with the measurement indicative of the state 267c. Finally, the method corrects 280c the state 265c based on a difference 275c between the measurement and measurement model with the state from the motion model inserted into the model, to produce an updated state 285c.

Using the motion model and the measurement model, the particle filter determines the PDF of state recursively as a weighted combination of states of each particle at each time step of control t, $$p(x_{0:k} \mid y_{0:k}) \approx \sum_{i=1}^{N} q_k^i \delta_{x_{0:k}^i}(x_{0:k}),$$

wherein $\delta(\cdot)$ is the Dirac delta mass and $q_k^i$ is the weight. Using the motion model including the tire friction function, one embodiment samples multiple samples from a process noise and propagates the state forward in time, and determines the weight according to $q_k^i \propto q_{k-1}^i p(y_k \mid x_k^i)$, wherein $p(y_k \mid x_k^i)$ is the measurement model written as a PDF, the likelihood. Upon multiple such propagation, the embodiment forms a state trajectory.

In some embodiments, the set of states generated from the particle states including weights of each state, wherein the weights reflect an error between the state and the indicative state, is used to updating the PDF of tire friction for each particle by decreasing the error between the state and the motion resulting in the state when used in the motion model. Such an error reflects the error due to the error in tire friction function and can be used to update the probability distribution of friction function, since a PDF of tire friction function can be determined as a weighted combination of PDFs of tire friction function for each particle. This is possible because the indicative state is already used in determining the state and is influencing the weight of each state.

Figure 2D:
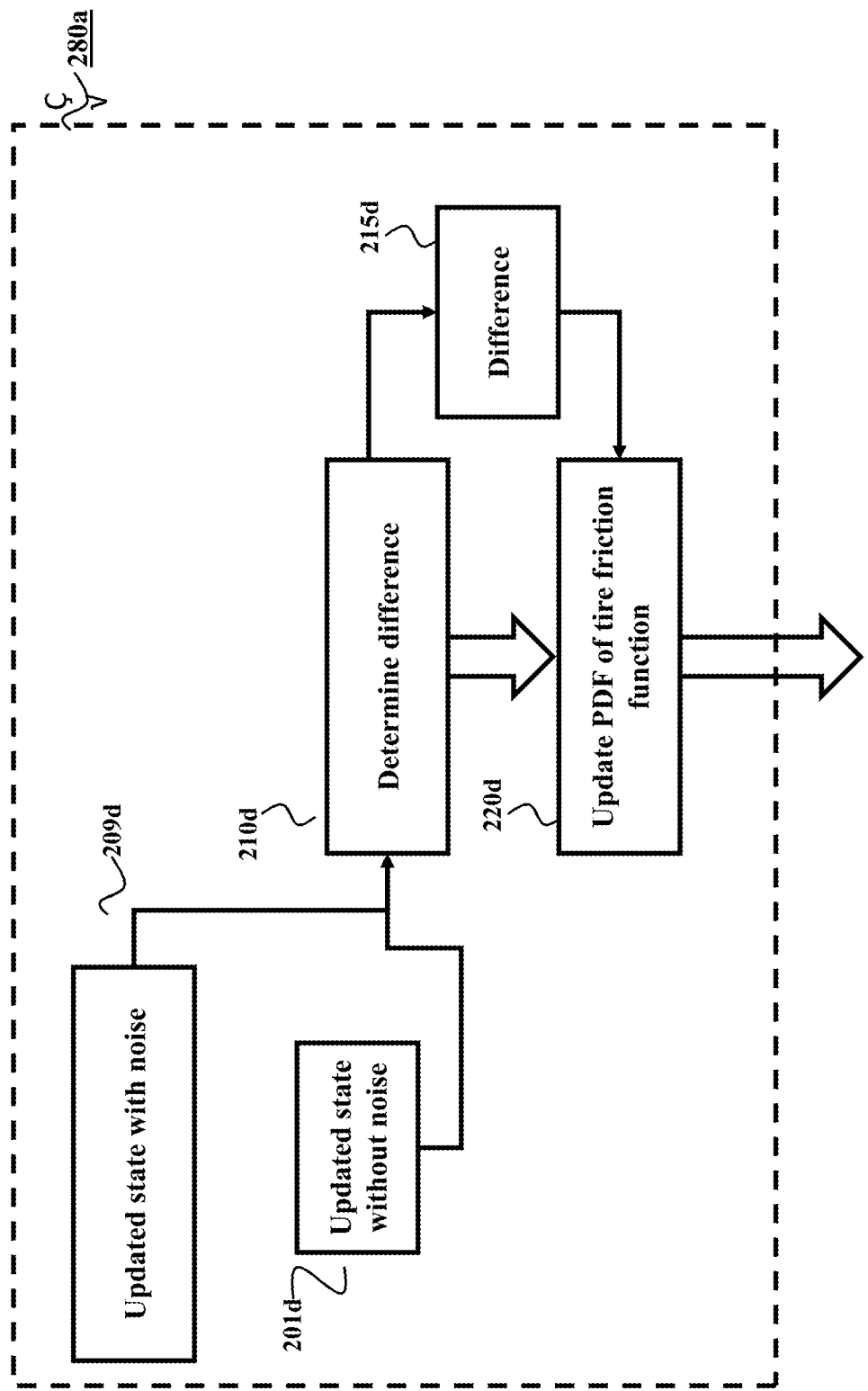
FIG. 2D shows a block diagram of a method for updating a PDF of a tire friction function in each particle according to one embodiment.

FIG. 2D shows a block diagram of a method for updating a PDF of a tire friction function in each particle according to one embodiment. The method determines 210d a difference between the updated state 209d with the motion model having noise and the updated state 201d using the motion model without noise, and updates 220d the PDF of tire friction function based on the said difference 215d, to reduce an error between the updated state of the vehicle and the measurement of the state.

In some embodiments, the PDF of the tire friction function is a Gaussian process, i.e., a distribution over functions with a continuous domain, e.g. space, such that sample of the Gaussian process is a continuous tire friction function. Representing PDF of a tire function as a Gaussian process increases the accuracy of tire friction function estimation. However, estimating of the tire friction function according to principles of a Gaussian process is a computationally challenging task.

Some embodiments are based on realization of a manner of simplification the estimation of the Gaussian process to determine the tire friction function. Specifically, in some embodiments, a tire friction function is regarded as a weighted combination of a finite number of basis functions, wherein each basis function is a function of the wheel slip, which is a known function of the vehicle slip, and Gaussian process of the tire friction function is captured by Gaussian distributions of weights of basis function. In other words, to update Gaussian process some embodiments can just update these Gaussian distributions of weights, and to sample tire friction function some embodiments can just sample N scalar weights from Gaussian distribution. In effect, regarding the tire friction function as a weighted combination of basis functions significantly decreases the computational requirements for estimating the tire friction in probabilistic manner.

Figure 3A:
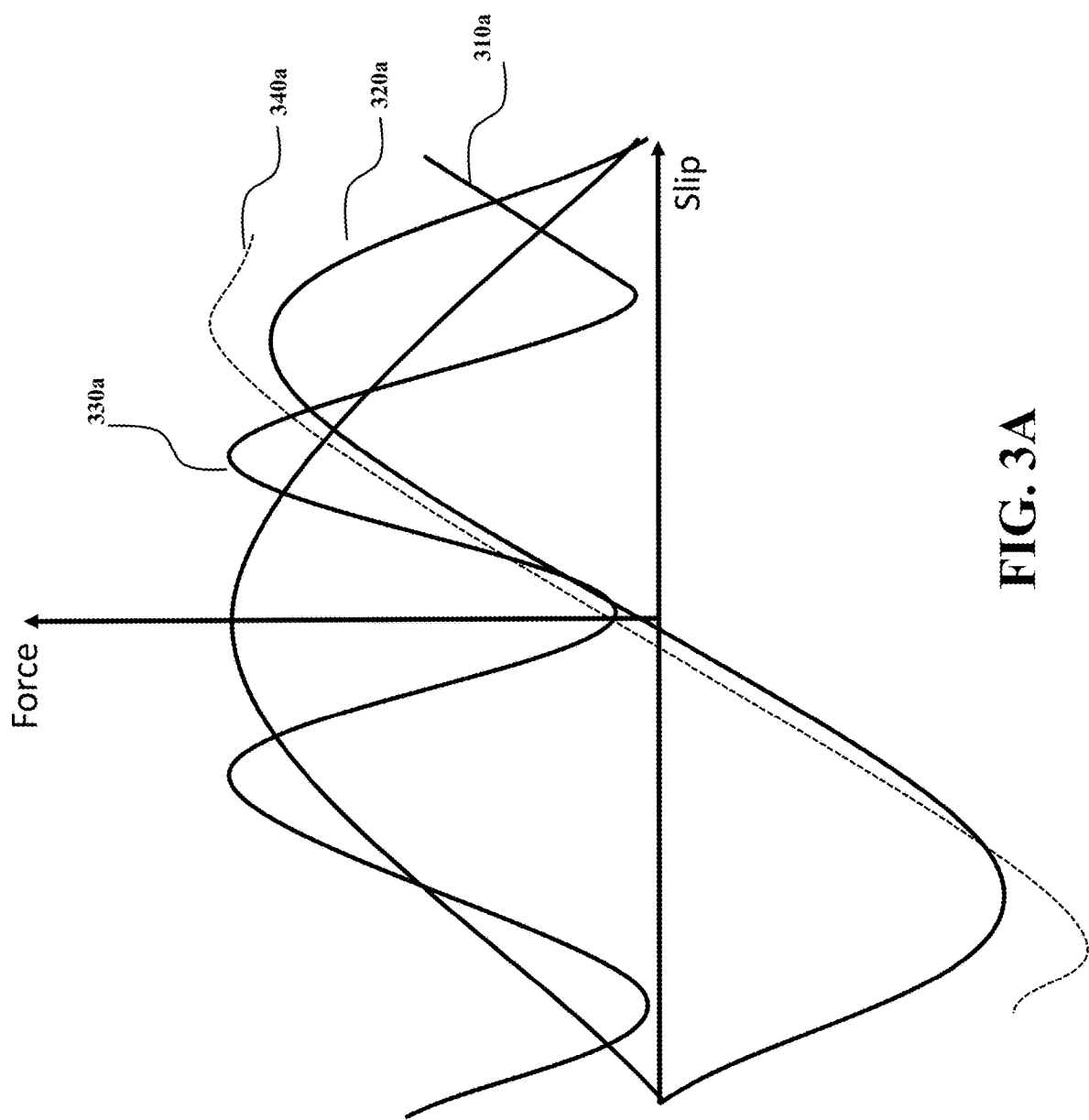
FIG. 3A shows an illustration of the use of weighted basis functions according to one embodiment.

FIG. 3A shows an illustration of the use of weighted basis functions according to one embodiment. In the illustration there are three basis function 310, 320a, and 330a. Also shown is the true tire friction function 340a. By combining the basis functions and using different weights for each basis functions, they can be combined to reproduce the true friction function.

Figure 3B:
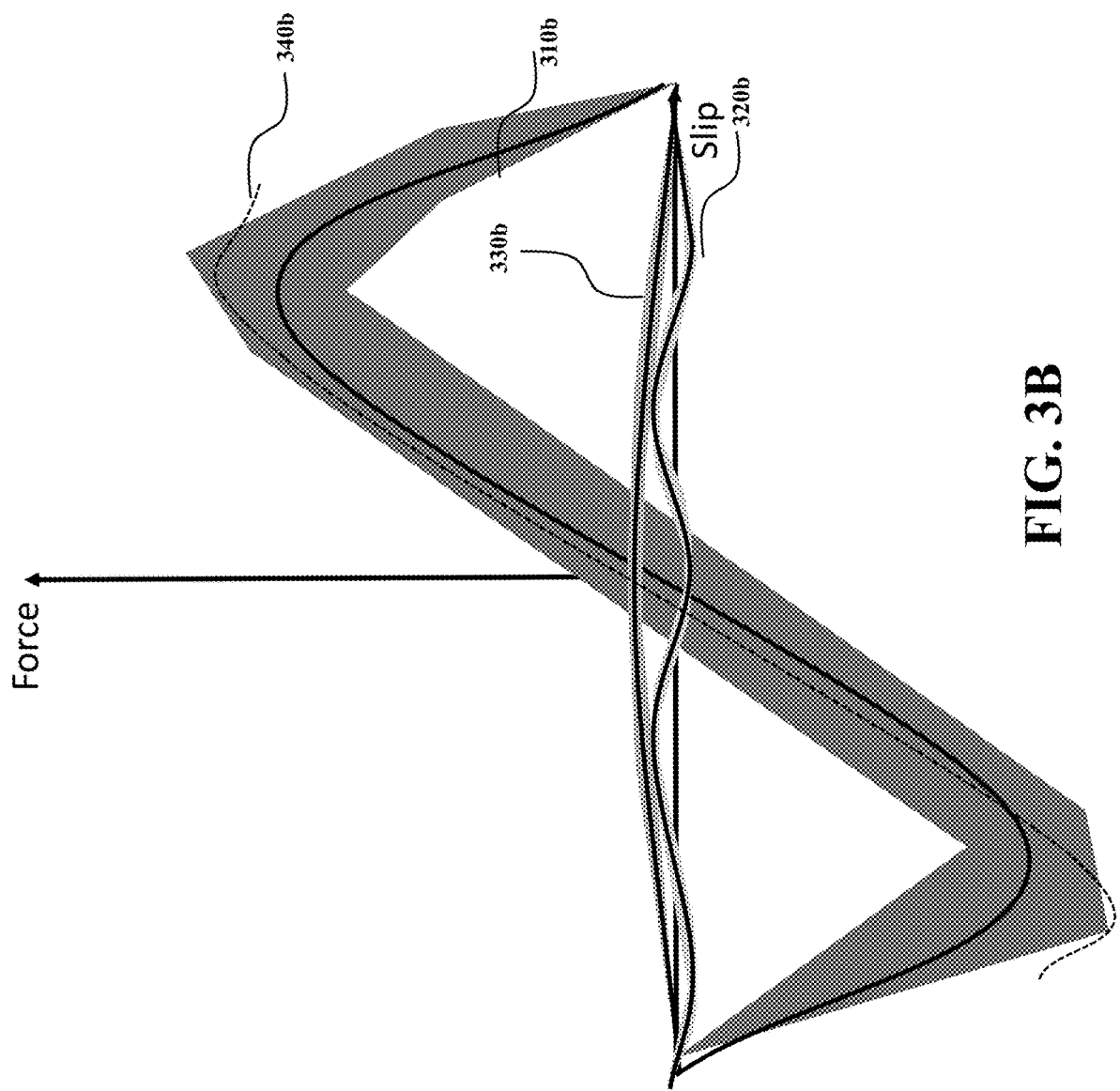
FIG. 3B shows an illustration of the influence of the weights of the basis functions for a subset of the friction function, in accordance with some embodiments.

FIG. 3B shows an illustration of the influence of the weights of the basis functions for a subset of the friction function 340b, in accordance with some embodiments. By letting the weights of functions 320b and 330b be very small, and the weight of 310b be large, the basis function expansion can reproduce the tire friction function 340b with only one basis function. Although FIG. 3B is a simplified schematic, it illustrates the principles of basis functions and the computational efficiency it can have.

In other embodiments, the tire friction function is a Gaussian process modeled as a weighted combination of a set of basis functions wherein each weight of each function has a Gaussian probability distribution, and wherein to update the probability distribution of the tire friction function the processor is configured to update the Gaussian probability distribution of at least some weights of the weighted combination of the set of basis functions. For instance, one embodiment models the tire friction function as $f(x) \sim GP(0, \kappa(x,x'))$, wherein the covariance function $\kappa(x, x')$ of the Gaussian process is formulated in terms of Laplace operators, $$\kappa_\theta(x, x') \approx \sum_{j_1,\ldots,j_d=1}^{\cdots} S_\theta(\lambda^{j_1,\ldots,j_d}) \phi^{j_1,\ldots,j_d}(x) \phi^{j_1,\ldots,j_d}(x').$$

With basis functions $$\phi^{j_1,\ldots,j_d} = \prod_{n=1}^{d} \frac{1}{\sqrt{L_n}} \sin\left(\frac{\pi j_n (x_n + L_n)}{2L_n}\right),$$

the tire friction function is $$f(x) \approx \sum_j \gamma^j \phi^j(x),$$

where the weights are Gaussian distributed, $\gamma^j \sim \mathcal{N}(0, S(\lambda^j))$.

One embodiment recognizes that using weighted basis functions can be used to model the motion of the vehicle as $$\zeta_{k+1} = \underbrace{\begin{bmatrix} \gamma_1^1 & \cdots & \gamma_1^m \\ \vdots & & \vdots \\ \gamma_d^1 & \cdots & \gamma_d^m \end{bmatrix}}_{A} \underbrace{\begin{bmatrix} \phi^1(\alpha_k) \\ \vdots \\ \phi^m(\alpha_k) \end{bmatrix}}_{\varphi(\alpha_k)} + w_k,$$

Wherein A is the matrix of weights and $\varphi(\alpha_k)$ is the vector of basis functions as a function of the wheel slip. The left hand side can be obtained as a combination of the deterministic part of the motion model and the vehicle state in the future time step.

Figure 3C:
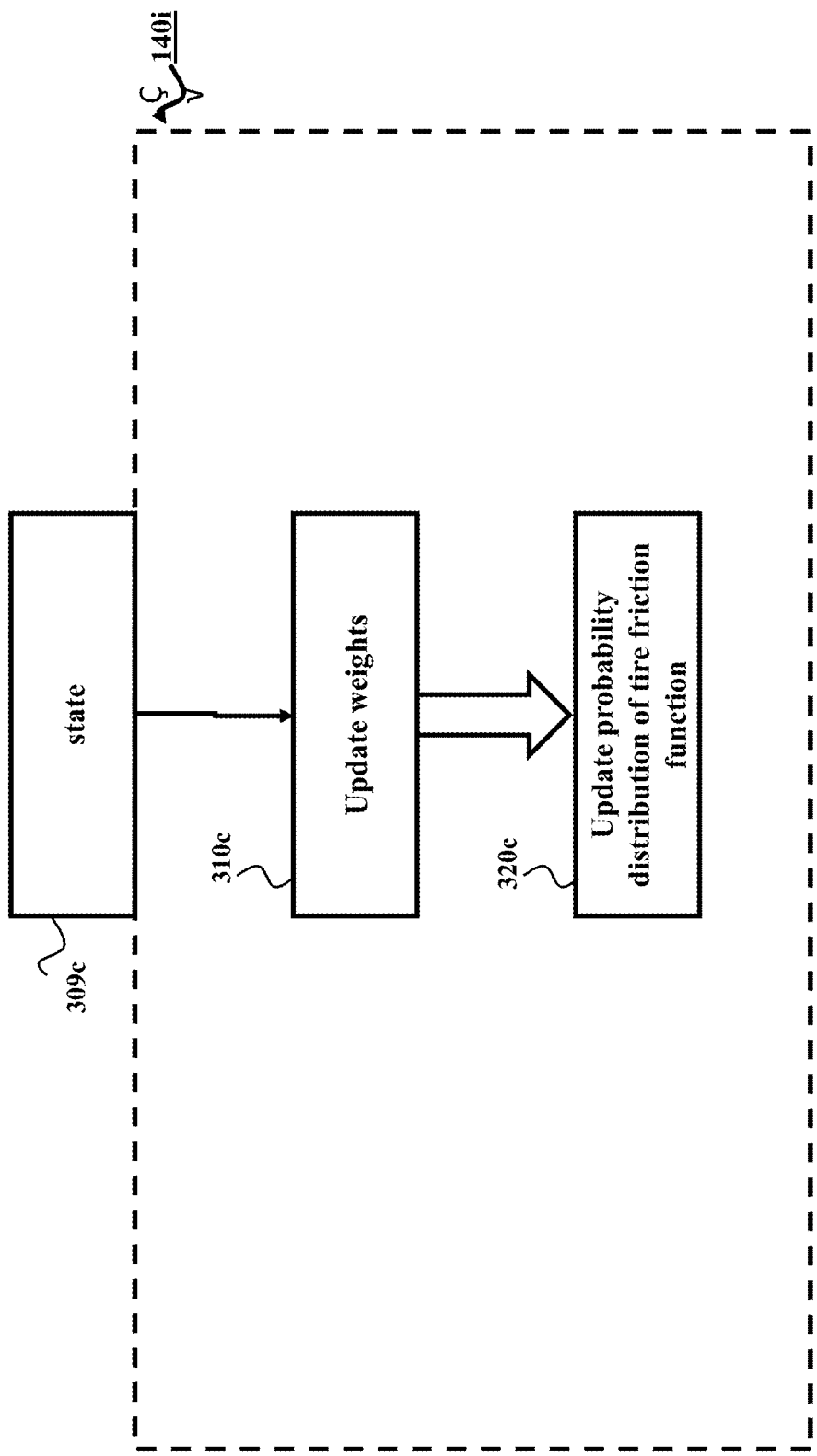
FIG. 3C shows a block diagram of one iteration of a method for updating the probability distribution of tire friction function in each particle according to one embodiment.

FIG. 3C shows a block diagram of one iteration of a method for updating 280a the probability distribution of tire friction function in each particle according to one embodiment. The method updates 310c the weights of the weighted combination of basis functions using the updated state 310c in the particle and updates the probability distribution 320c of the tire friction function according to the weighted combination of the basis functions weighted with the updated weights.

Figure 3D:
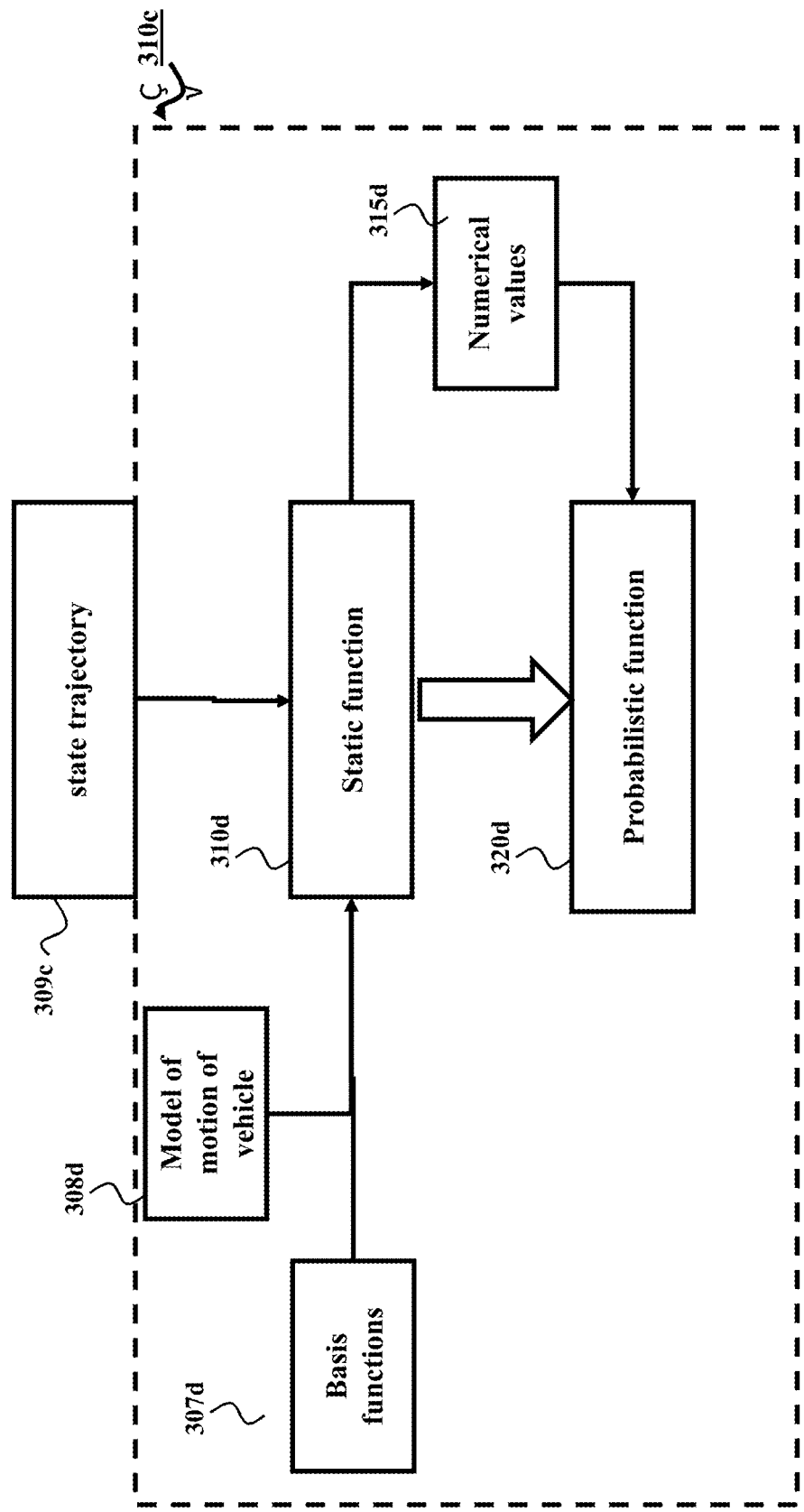
FIG. 3D shows a block diagram of a method for updating the weights of the weighted combination of basis functions according to one embodiment.

FIG. 3D shows a block diagram of a method for updating the weights of the weighted combination of basis functions in each particle according to one embodiment. The method uses a static function 310d stored in memory having as input the state 309c, the model of motion of vehicle 308d, and basis functions 307d, that maps the input to a set of numerical values 315 stored in matrices. Then, the method uses the determined numerical values 315d and a probabilistic function 320d mapping the numerical values 315d to a distribution of the weights. The updated weights can be sampled on that distribution of the weights or the distribution of the weights can be used directly in subsequent calculations.

In one embodiment, the probabilistic function is a matrix-Normal distribution parametrized by the numerical values 315d, that is, $A \sim \mathcal{MN}(0,Q,V)$. In another embodiment, the process noise is parametrized as an inverse Wishart distribution, $Q \sim \mathcal{IW}(\ell_Q, \Lambda_Q)$. Updating the weights of basis functions and possibly also the process noise covariance is updating as a function of the state and measurement sequence as $$p(Q|x_{0:T}^i, y_{0:T}) = \mathcal{IW}(Q|T+v_0, \Lambda_T) \text{ and}$$

$$p(A|Q, x_{0:T}, y_{0:T}) = \mathcal{MN}(A|M_T, Q, (\Sigma_T + V)^{-1}), \text{ where}$$

$$M_T = \Psi_T \left( \sum\nolimits_T + V \right)^{-1}, \Lambda_T = \Lambda_0 + \Phi_T - M_T \Psi_T^T, \text{ wherein}$$

$$\Phi_T = \sum_{k=1}^{T-1} x_{k+1} x_{k+1}^T,$$

$$\Psi_T = \sum_{k=1}^{T-1} x_{k+1} \varphi(x_k)^T,$$

$$\sum\nolimits_T = \sum_{k=1}^{T-1} \varphi(x_k) \varphi(x_k)^T.$$

are determined from the state trajectory as a static mapping from the determined state trajectory to updated weights of basis functions. For instance, in one embodiment the matrices are updated recursively for each time step of control $$\Phi_{k+1} = \Phi_k + \zeta_{k+1} \zeta_{k+1}^T,$$

$$\Phi_{k+1} = \Phi_k + \zeta_{k+1} \varphi(\alpha_k)^T,$$

$$\Sigma_{k+1} = \Sigma_k + \varphi(\alpha_k) \varphi(\alpha_k)^T.$$

k as

In one embodiment the updating is used for each particle, i.e., each particle determines its own PDF of tire friction function. The PDF of tire friction function can then be determined as a weighted combination of each particle's PDF of tire friction function. Doing in such a manner ensures that even though the tire friction function is modeled as a Gaussian process, using several particles can suppress situations where the Gaussian process assumption is unrealistic.

One embodiment recognizes that while the measurement model is dependent on the tire friction function, for instance, when using inertial sensors, having unknowns in both measurement model and motion model can lead to a very complex estimation problem. Hence, in one embodiment an a priori simplified model of the tire friction function is used in the measurement model in the first iterations. For instance, one embodiment uses a linear model of the tire friction function determined using standard methods. Doing in such a manner ensures that the estimation of the tire friction function is not underdetermined.

In one embodiment, after a number of time steps of control when the estimates have started to converge, the linear tire friction model is replaced with the belief of tire friction function. Doing in such a manner ensures that the linear model is not trusted excessively and that the true tire friction is eventually used in the measurement model.

Figure 4A:
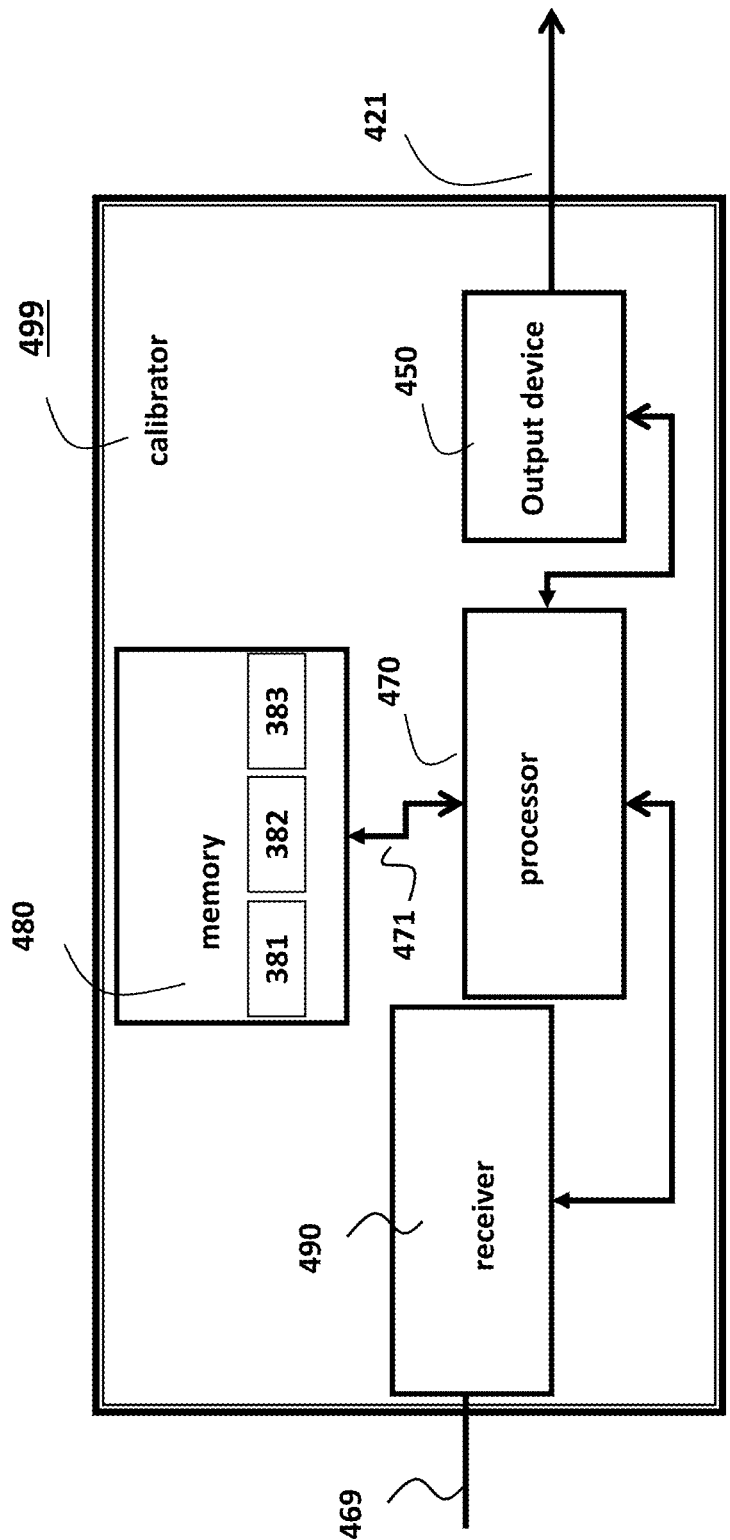
FIG. 4A shows a general structure of a system for recursively, i.e., at each time step of control, controlling a vehicle by jointly estimating a state of a vehicle and a function of a tire friction of a vehicle traveling on a road according to one embodiment.

FIG. 4A shows a general structure of a system 499 for recursively, i.e., at each time step of control, controlling a vehicle by jointly estimating a state of a vehicle and a function of a tire friction of a vehicle traveling on a road according to one embodiment. The tire friction is a nonlinear function describing a friction between a surface of the road and a tire of the vehicle as a function of slippage of a wheel of the vehicle. The joint state and tire friction function estimator 499 includes at least one processor 470 for executing modules of the estimator 499, such as updating iteratively a probability distribution of the tire friction function as control inputs and measurements are collected.

The processor is configured to execute the particle filter to update each particle based on a motion model and a measurement model of the vehicle, control commands moving the vehicle and the measurement of the state where the vehicle is moved according to the control command; and generate a control command based on the motion of the vehicle and the weighted combination of the states of the particles and the PDF of the tire friction function provided in the particles. For example, an iteration samples the process noise for each particle, updates a state of the vehicle in the particles resulting from the control input according to the motion model including the sample of the tire friction function, and updates the state of the vehicle resulting from the measurement according to the measurement model, and updates the PDF of the tire friction function to reduce an error between the updated state of the vehicle and the measurement of the state.

The processor 470 is connected 471 to a memory 480 that stores a particle filter maintaining a set of particles, each particle includes an estimation of a state of the vehicle, an estimation of a PDF of a tire friction function, and a weight indicative of a probability of the particle.

The memory can also store 483 the motion data indicative of the motion of the vehicle on the road according to a trajectory, wherein the motion data includes a control input to the vehicle that moves the vehicle according to the trajectory and a measurement of the motion of the vehicle moved along the trajectory, and wherein the measurement corresponds to the control input. Alternatively, the system can contain a receiver 490 to receive motion data 469 indicative of the motion of the vehicle on the road according to a trajectory. The system also includes an output device 450 device to render at least one or a combination of the probability distribution of the tire friction function and a sample of the probability distribution of the tire friction function at each time step of control. Alternatively, or additionally, the system outputs at least one or a combination of the probability distribution of the vehicle state and a sample of the probability distribution of the vehicle state at each time step of control. To enable certain embodiments of the invention, the memory 480 also stores 483 the internal information of the estimator, including, but not limited to, values of the tire friction function, values of each computed state of the vehicle for different iterations, the motion leading up to each state of the vehicle, and the sampled process noise leading up to the state.

In one embodiment, the motion data indicative of the motion of the vehicle is preprocessed before execution.

Figure 4B:
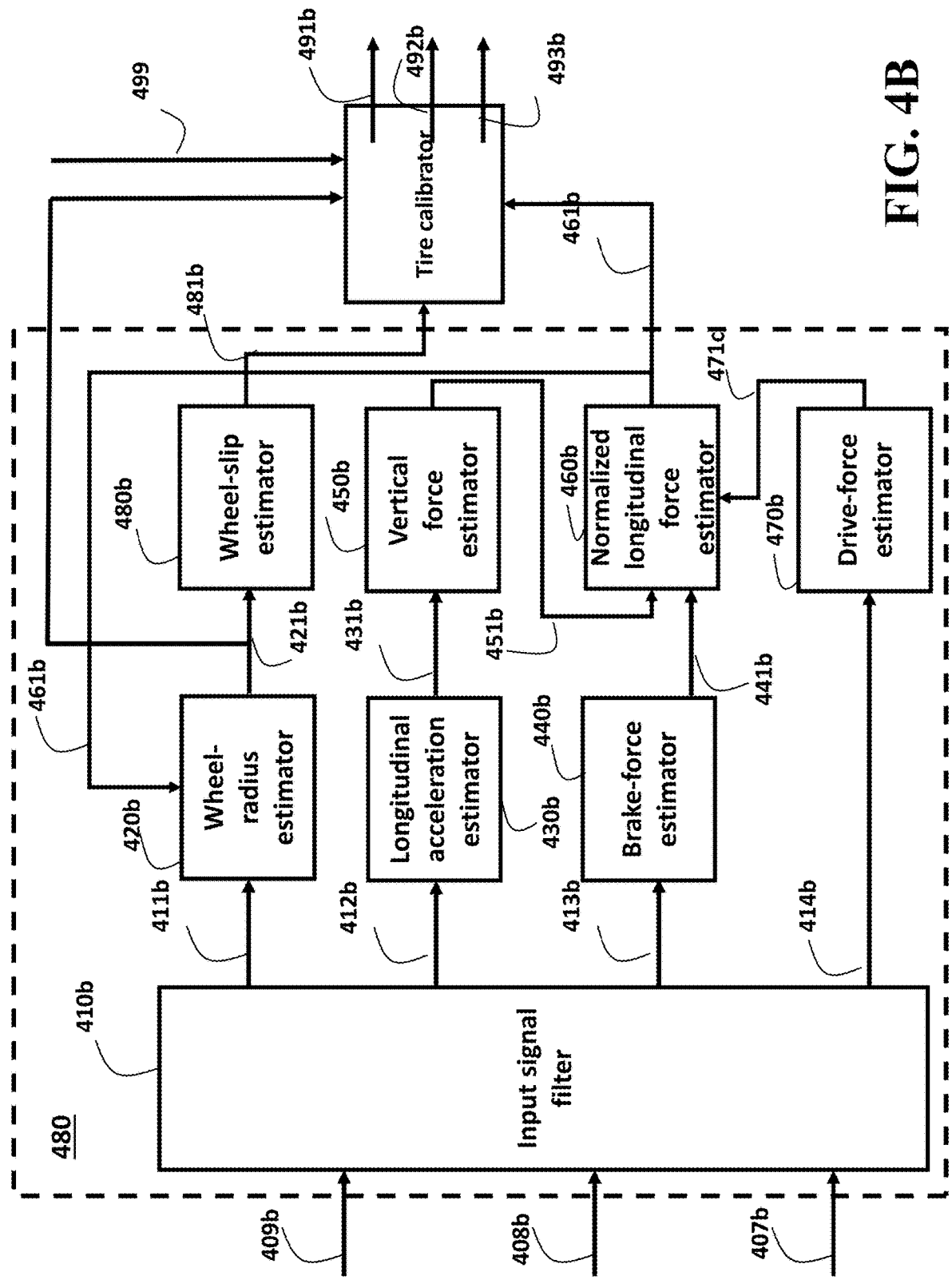
FIG. 4B shows a block diagram of a method for determining or estimating the internal signals from the vehicle, to be used by the joint state and tire friction function estimator, according to one embodiment.

FIG. 4B shows a block diagram of a method for determining or estimating the internal signals from the vehicle, to be used by the joint state and tire friction function estimator, according to one embodiment. The steps leading up to 481b and 461b can be implemented into a control unit or circuit arrangement, which can be used in systems such as ABS, ESP, ADAS, or in autonomous vehicles. For example, input signal filter 410b can determine the input signals by processing rotational rate of the wheels or tires 409b to produce a signal 411b, whereby the rotational rates can be determined for each individual wheel or tire of the vehicle. The filter 410b can also determine the input signal 412b by processing the brake pressure 408b and determine the input signal 413b by processing the rotational rate and torque from the engine 407b. The block 430b determines the longitudinal acceleration 431b, while a brake-force estimator 440b estimates the braking force 441b for each wheel using the applied brake pressures 13b. From the values of the engine torques and rotation rate 414b of the engine, a module in the control unit estimates the driving force in the longitudinal direction, while the vertical force 451b is estimated in 450b, for example using estimates of the longitudinal acceleration 431b.

Using the vertical force estimates 451b and the longitudinal force estimates 441b and 471b, the normalized longitudinal force 461b can be determined. A wheel-radius estimator 420b uses the processed rotational rates 411b of the tires or wheels and the estimate of the normalized driving force 461b to correct the wheel radius and outputs the wheel radius with the rotation rates 421b. For example, the wheel-radius estimator 420b estimates the wheel-slip 321b. Thus, the signal conditioner 420 can provide the tire friction estimator 440 with estimates of the longitudinal velocity 421b, wheel-slip estimates 481b, or normalized longitudinal force 461b, or a combination thereof. Accordingly, in some embodiments, the tire calibrator 450 uses the estimates of one or combination of the longitudinal velocity 421b, wheel-slip estimates 481b, and normalized longitudinal force 461b.

Different types of motion models can be used. For computation purposes, a simple model is preferred, because it facilitates fast implementations computation wise. However, a high-fidelity model is preferred if model accuracy is important.

Moreover, depending on the model that is employed by the invention, different number of parameters can be calibrated.

Figure 4C:
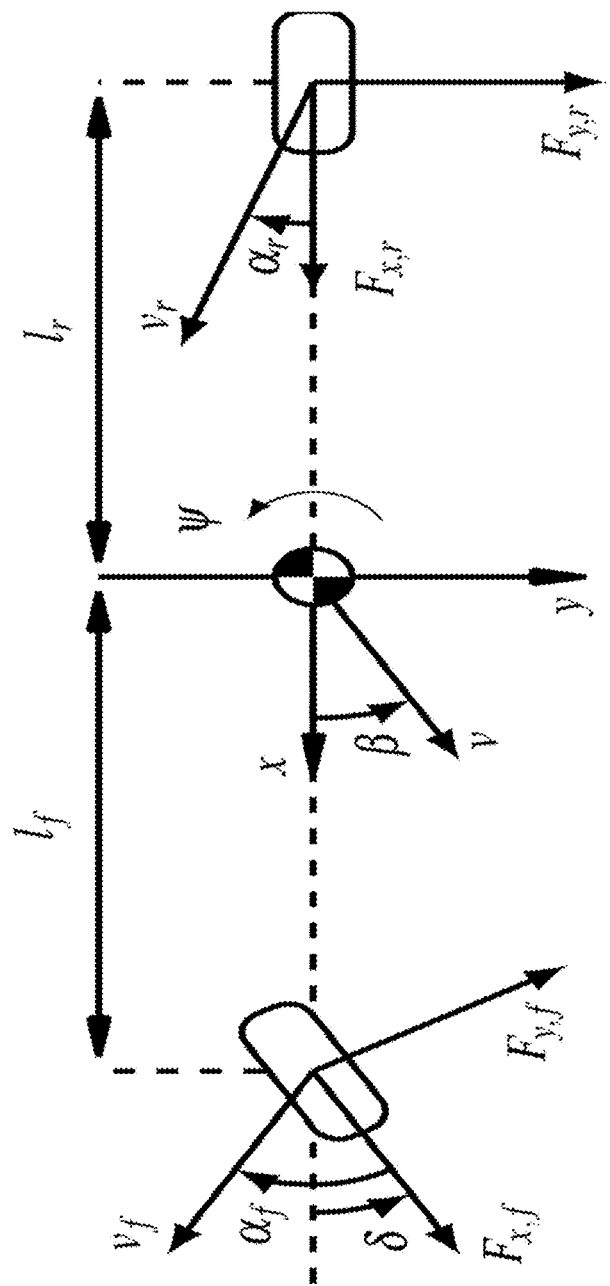
FIG. 4C shows a schematic of a simplified front-wheel drive single-track model of the vehicle, in which the two wheels on each axle are lumped together, in accordance with one embodiment.

FIG. 4C shows a schematic of a simplified front-wheel drive single-track model of the vehicle, in which the two wheels on each axle are lumped together, in accordance with one embodiment. This model depends on 4 tire friction functions when accelerating, one longitudinal and two lateral. In FIG. 4C, 'δ' is the steering angle of the front wheel, α is the slip angle in the lateral case, β is the body slip of the vehicle, which is defined as the ratio of the forward and lateral velocity of the vehicle, and is the longitudinal (forward) and lateral force, respectively.

Figure 4D:
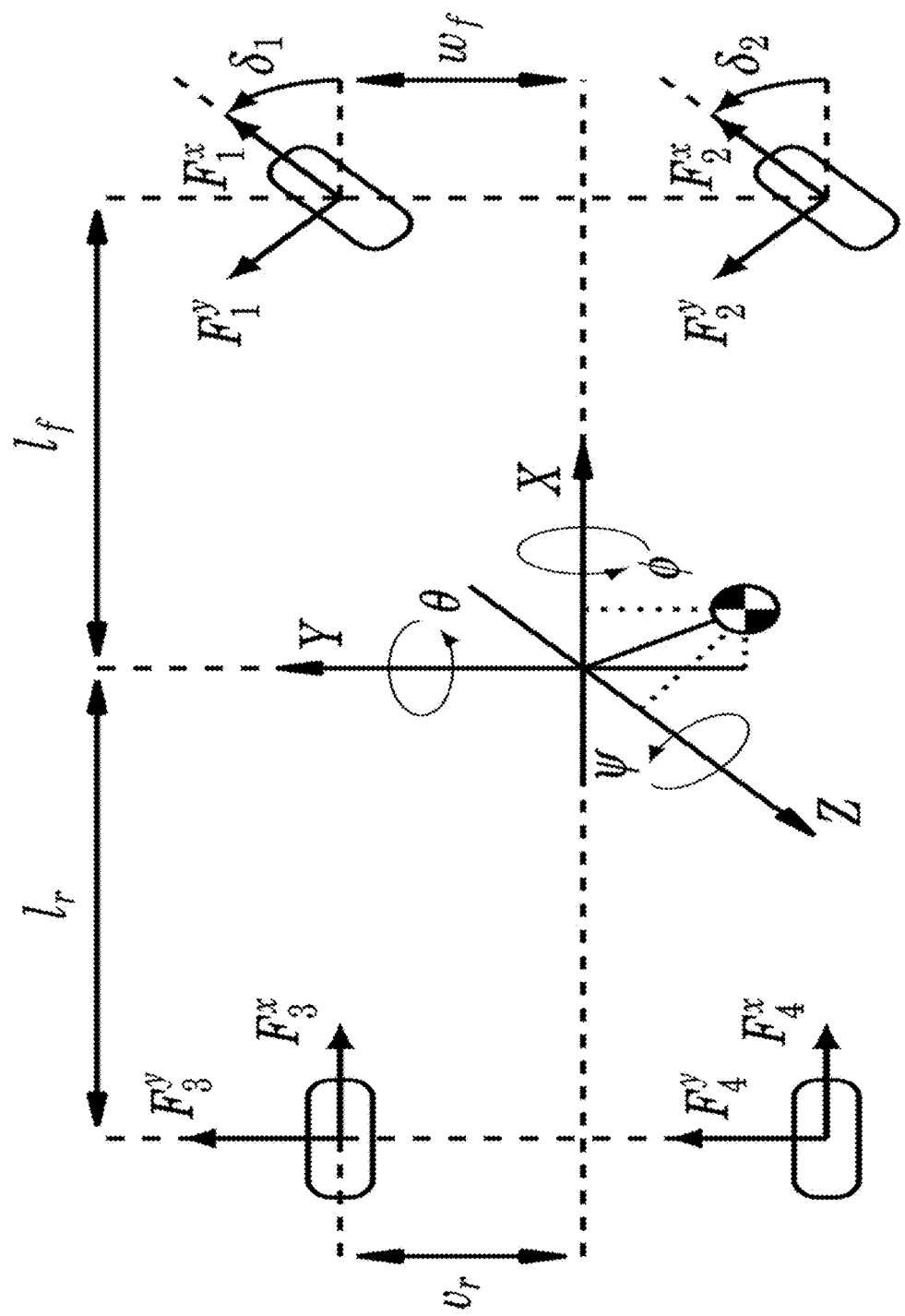
FIG. 4D shows a schematic of a double-track model, which models all 4 wheels used by one embodiment.

FIG. 4D shows a schematic of a double-track model, which models all 4 wheels, in accordance with one embodiment. With such a model, eight tire friction functions affect the motion of the model of the vehicle.

FIG. 5A shows schematic illustrating principles of some embodiments. Specifically, to illustrate why a properly determined state can determine tire friction function, FIG. 5A shows a scenario where the vehicle has an initial state 510. For one belief of tire friction, sampled from the probability distribution of the tire friction, and a given input to the system, the vehicle obeys the motion 511a and ends up in 530a, with resulting uncertainty 531a. The inherent uncertainty in the second state arising due to noise, bias in sensors, and remaining sensor errors, leads to that the state of the vehicle can only be known up to a certain area 520. However, the end state of the vehicle 530a well resides within the area 520, so this particular combination of tire friction and initial state of the vehicle, is given a high probability of being a good combination. Hence, the probability distribution of the tire friction is likely to be a good distribution, since the sample of tire friction corresponds to said distribution.

Figure 5B:
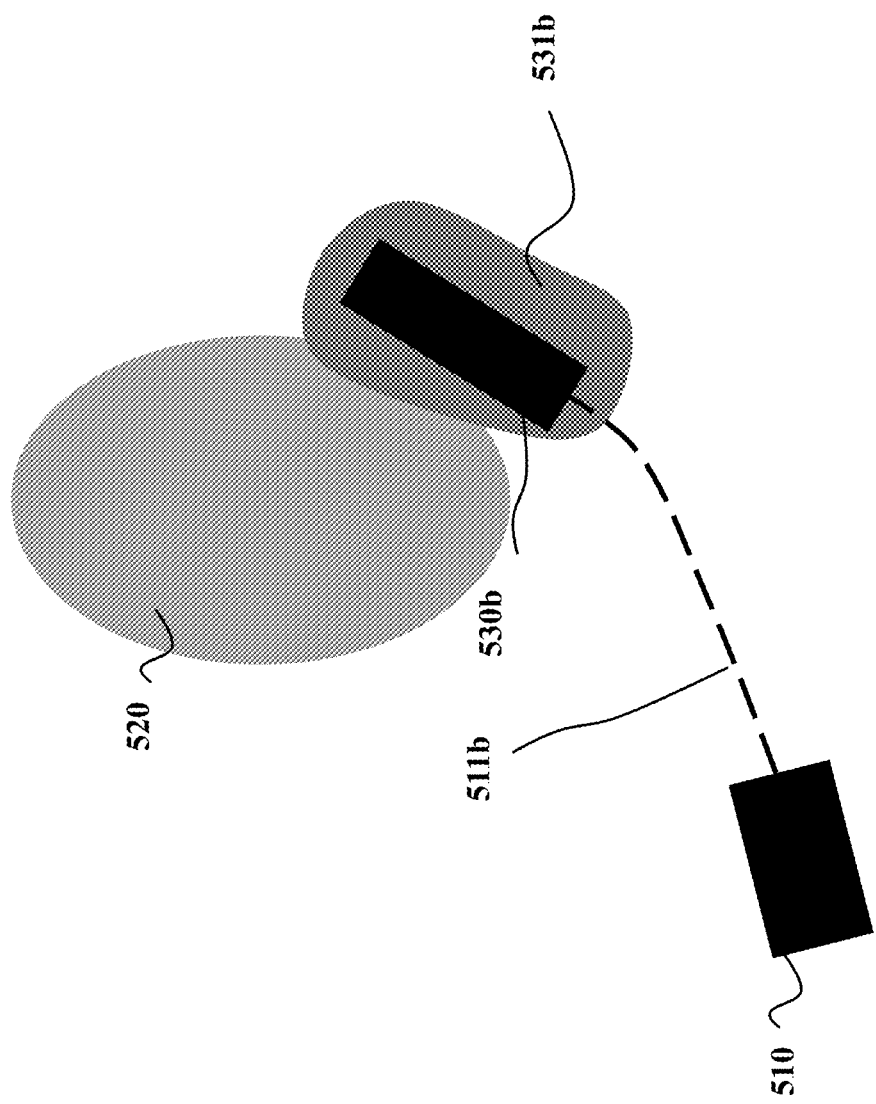

FIG. 5B shows a vehicle with the same initial state 510, possibly with the same bias terms of the sensors, but with another tire friction function inserted into the motion model. For the same inputs to the system, the vehicle 510 now obeys the motion 511b, leading to that the vehicle ends up in state 530b, with resulting uncertainty 531b. However, this end state 530b of the vehicle does not reside within the certainty area of the sensors. Thus, this particular combination of initial state, tire friction function, and bias terms, is assigned a low probability of being a good combination. Hence, the estimated distribution of the tire friction is less likely to be a good distribution.

In some embodiments, the generating the state is done by generating a set of particles at each time step of control, each particle representing a state, determined with different samples drawn from a probability distribution of a process noise and associate a weight $q_k^i$ with each particle, which reflects comparing each particle from the set with the indicative state. In some embodiments, whenever a particle gets assigned a low weight below some threshold, the particle is removed from the estimating and replaced with a particle that has a higher weight, i.e., a higher probability of being a good particle. In one embodiment, the determining the state is performed as a combination of the particles weighted according to the weights of each particle.

Figure 6A:
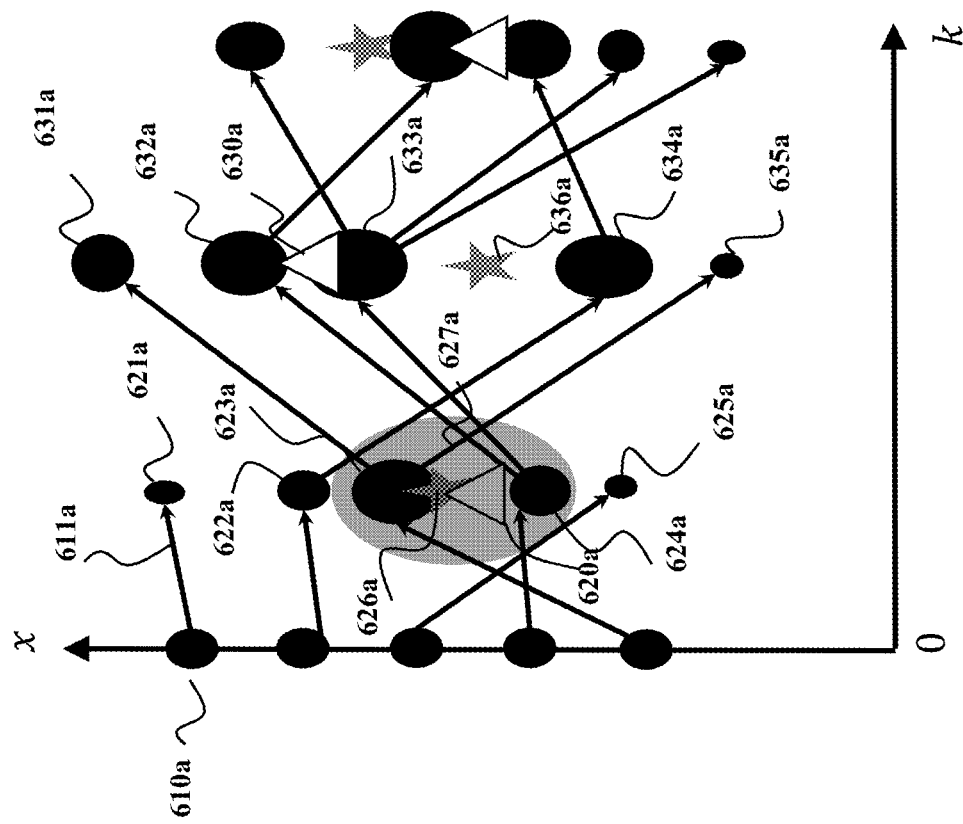
FIG. 6A shows a simplified schematic of the result of three iterations of generating updated states in particles when five particles are generated for each iteration according to one embodiment.

FIG. 6A shows a simplified schematic of the result of three iterations of generating updated states in particles when five particles are generated for each iteration according to one embodiment. The initial state 610a is predicted forward in time 611a using the model of the motion, the input to the system, and the tire friction function sampled on the probability distribution of tire friction functions for that particle, to produce five next states 621a, 622a, 623a, 624a, and 625a. The probabilities are determined as a function of the measurement 626a and the model of the noise source and the bias 627a of the measurement 626a. At each time step of control, an aggregate of the probabilities is used to produce an aggregated state 620a and an aggregated tire friction function.

Figure 6B:
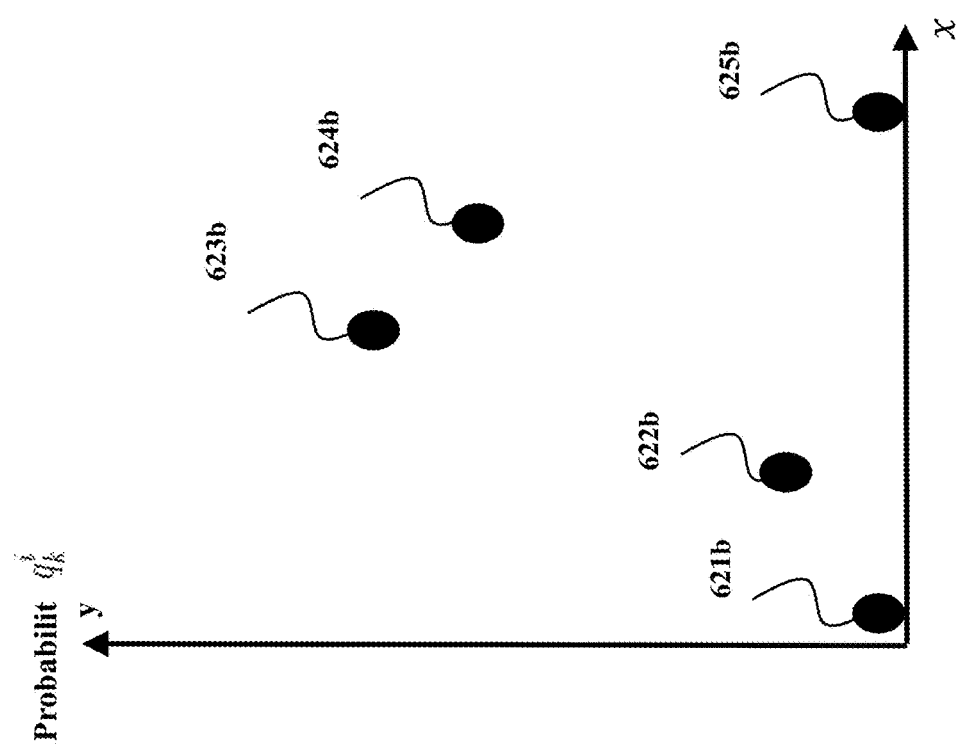
FIG. 6B shows possible assigned probabilities of the five states at the first iteration in FIG. 6A.

FIG. 6B shows possible assigned probabilities of the five states at the first iteration in FIG. 6A. Those probabilities 621b, 622b, 623b, 624b, and 625b are reflected in selecting the sizes of the dots illustrating the states 621b, 622b, 623b, 624b, and 625b.

There are many different tire models reported in literature. For instance, one way to model the tire force relation is through the Magic formula, or Pacejka model, given by $$F_0(m)=D \sin(C \arctan(Bm-E(Bm-\arctan(Bm)))), \quad (1)$$

where B is the stiffness factor, C is the shape factor, D is the peak factor, corresponding to the peak friction coefficient, E is the curvature factor, $F_0$ is either the longitudinal force or lateral force, and m is either the longitudinal slip or the lateral slip. Equation (1) is highly nonlinear and depends on parameters defining linear and non-linear parts of the friction function.

Another method is based on the Highway Safety Research Institute (HSRI) tire model, which is stated as $$F_y = \begin{cases} C_\alpha \cdot \dfrac{\tan\alpha}{1+\lambda} & \text{if } s_r \leq 0.5 \\ C_\alpha \cdot \dfrac{\tan\alpha}{1+\lambda} \cdot \dfrac{s_r - 0.25}{s_r^2} & \text{if } s_r > 0.5 \end{cases},$$

$$\text{where } s_r = \frac{\sqrt{(C_\lambda\lambda)^2 + (C_\alpha\tan\alpha)^2}}{\mu(1+\lambda)F_z}.$$

Figure 7A:
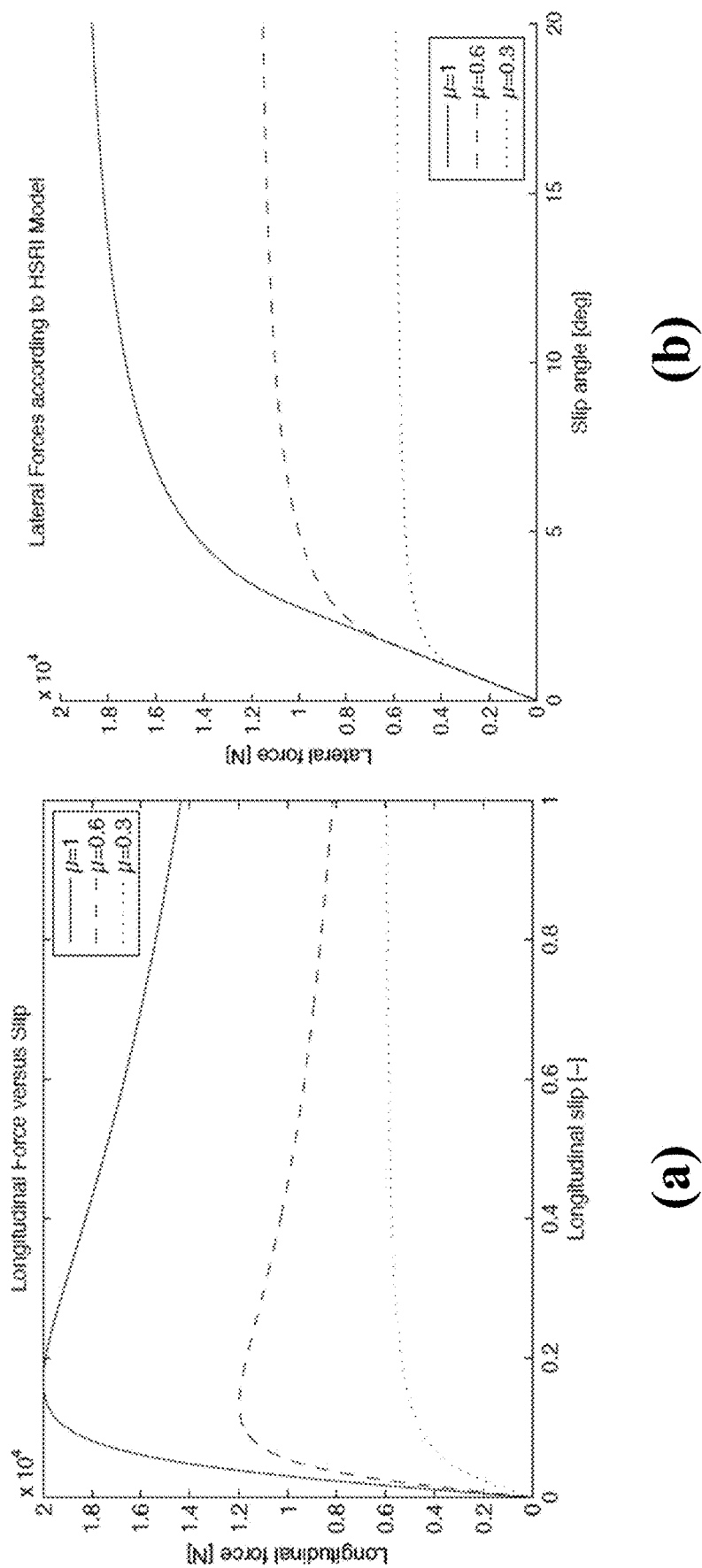
FIG. 7A shows a tire force plots as function of the wheel slip for different surfaces used by some embodiments.

FIG. 7A shows a tire force plots as function of the wheel slip for different surfaces used by some embodiments. Section (a) shows tire forces with the Pacejka model, and (b) shows the equivalent for the HSRI tire model. These are only two of the many different reported tire models parameterizing tire friction functions.

Even the two models try to describe the same behavior, (a) and (b) show significant differences. For instance, the Pacejka model (a) exhibits a clear peak in the tire friction curve for the two relatively higher friction surfaces, whereas the HSRI tire model is monotonically increasing with increasing slip values. Hence, a priori made choice of which tire model to use helps to accurately describe the behavior of the tire friction function, and thus the behavior of the motion model including the tire friction function. One embodiment is based on the recognition that any tire model is dependent on parameters fitted to data for that tire model, and that the data is highly uncertain.

Figure 7B:
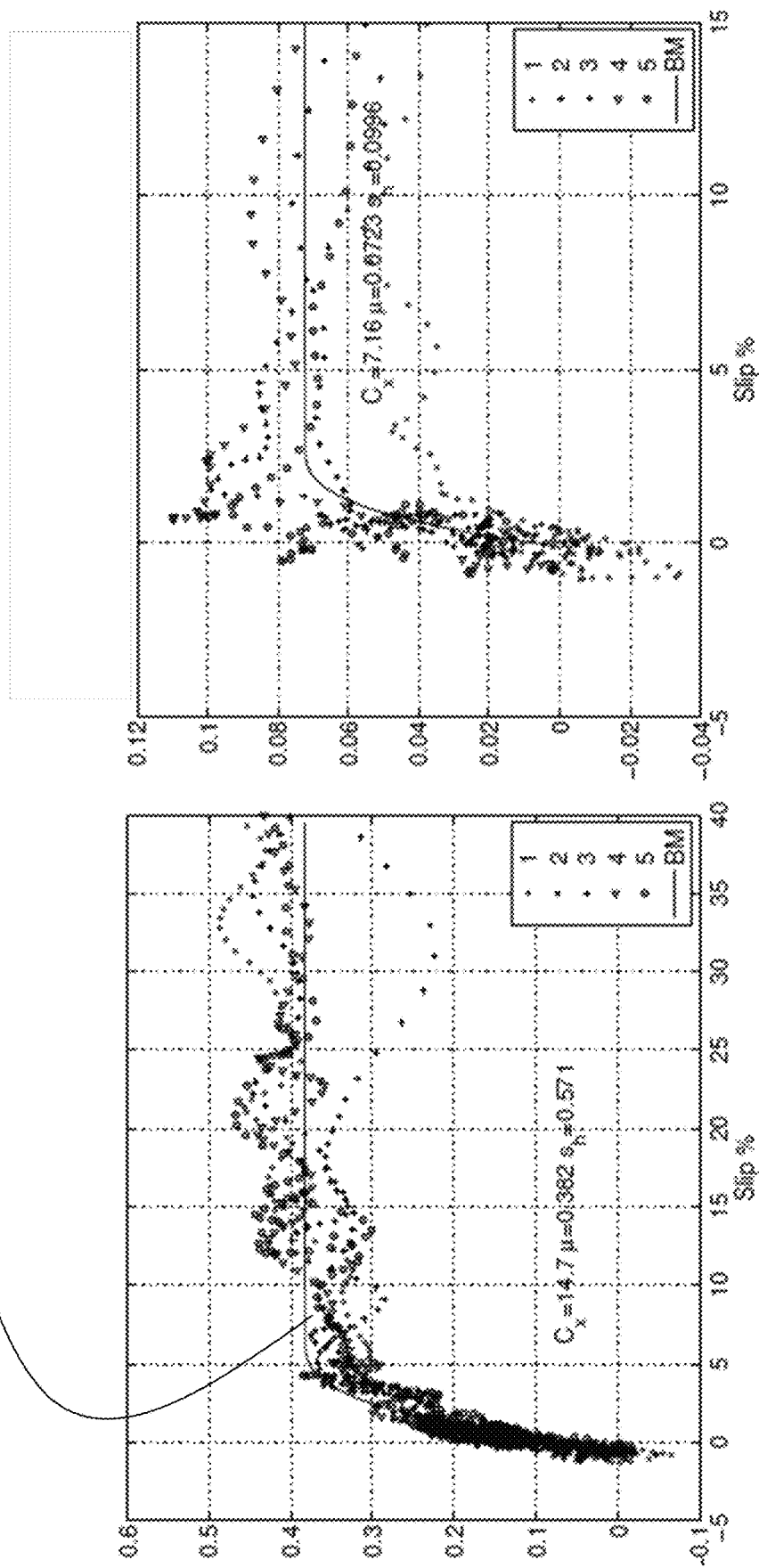
FIG. 7B shows measurement data obtained using a high-cost test rig, and a fitting 710b of a Brush tire model to the data according to one embodiment.

FIG. 7B shows measurement data obtained using a high-cost test rig, and a fitting $710b$ of a Brush tire model to the data according to one embodiment. The fitting of the parameters describing the model can be done in numerous ways, even when direct measurements of the friction are available. To this end, one embodiment determines a probability density of a tire friction function that is based on a weighted combination of basis functions because such a determination is nonparametric, i.e., does not depend on parameters of the model. Instead, such a determination only depends on scalar weights of each basis function.

Some embodiments are based on the realization that many control methods already used in production vehicles are based on different parametric tire models, and to deploy those controllers on a vehicle they need to be tuned according to the parameters of the tire model.

Figure 7C:
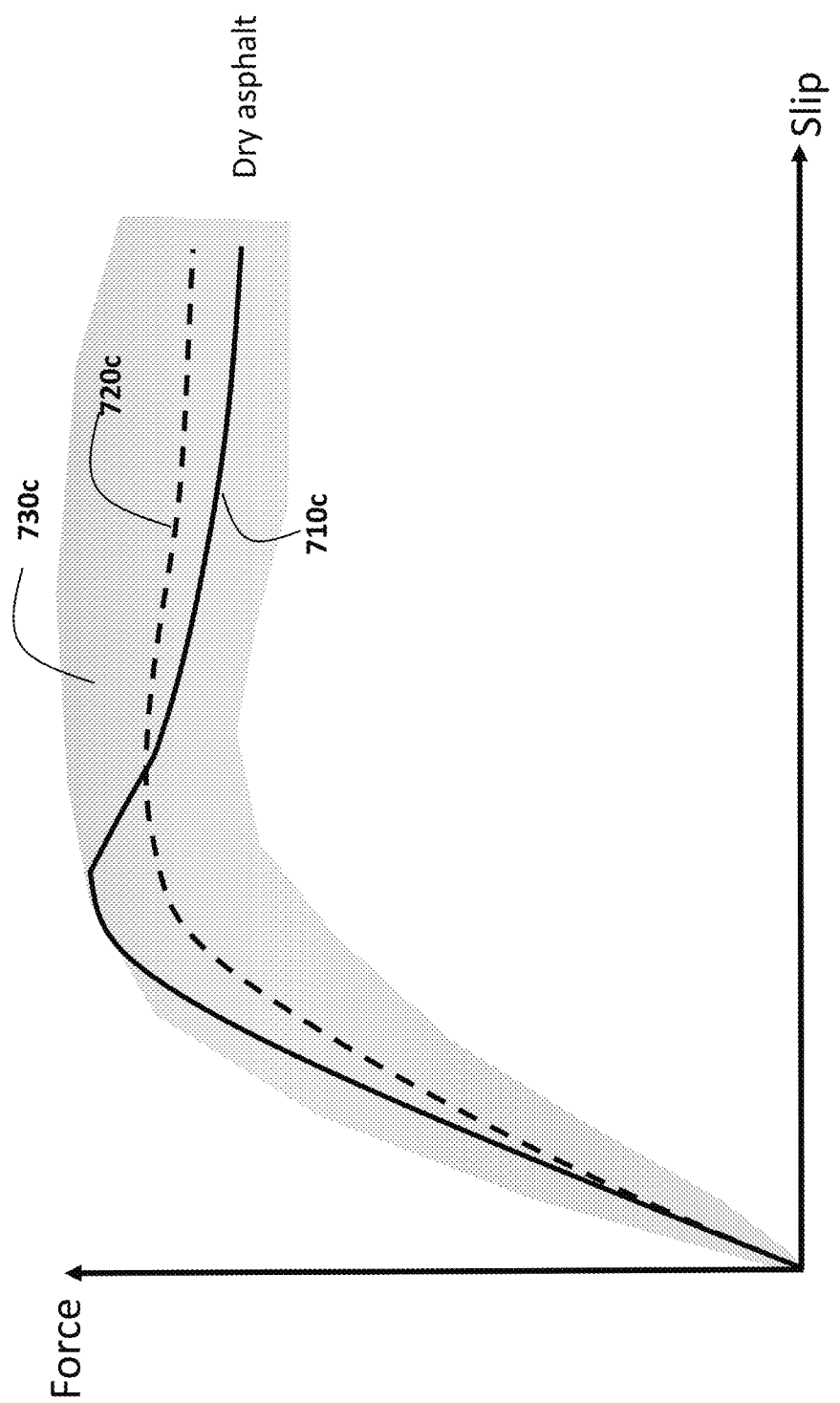
FIG. 7C shows a sample of the determined probability density as used by several embodiments.

FIG. 7C shows a sample $720c$ of the determined probability density $730c$ as used by several embodiments. Each sample on the probability density $730c$ is the entire tire friction function, such as a function $720c$. From the sample $720c$ of the probability density it is possible to fit $710c$ a parametric tire model. For example, a common way to model the tire force relation is through the Magic formula, or Pacejka model, given by (1), which includes a number of parameters. Furthermore, the Pacejka model is oftentimes used for control design. In one embodiment, the fitting $710c$ of the Pacejka model to the sample $720c$ of the probability density $130f$ is done by minimizing an error between the sample $720c$ and $710c$. In one embodiment, the minimizing is done while taking into account the uncertainty $730c$, such that the fitting $710c$ is well inside the probability density.

For instance, one embodiment uses the minimization criterion $$\min_{\mu_i, B_i, C_i, E_i} \int \frac{1}{\text{cov}(A\varphi(\alpha_i))} \|\hat{A}\varphi(\alpha_i) - F_i(\alpha_i)\|^2 d\alpha_i,$$

where the error between the nonparametric model $\hat{A}\varphi(\alpha_i)$ and the Pacejka model $F_i(\alpha_i)$ is $\|\hat{A}\varphi(\alpha_i) - F_i(\alpha_i)\|^2 m$ which is integrated for all slip values of interest. Furthermore, cov $(A\varphi(\alpha_i))$ is the covariance of the probability density $730c$, which is a measure of the spread of the probability density.

Figure 8:
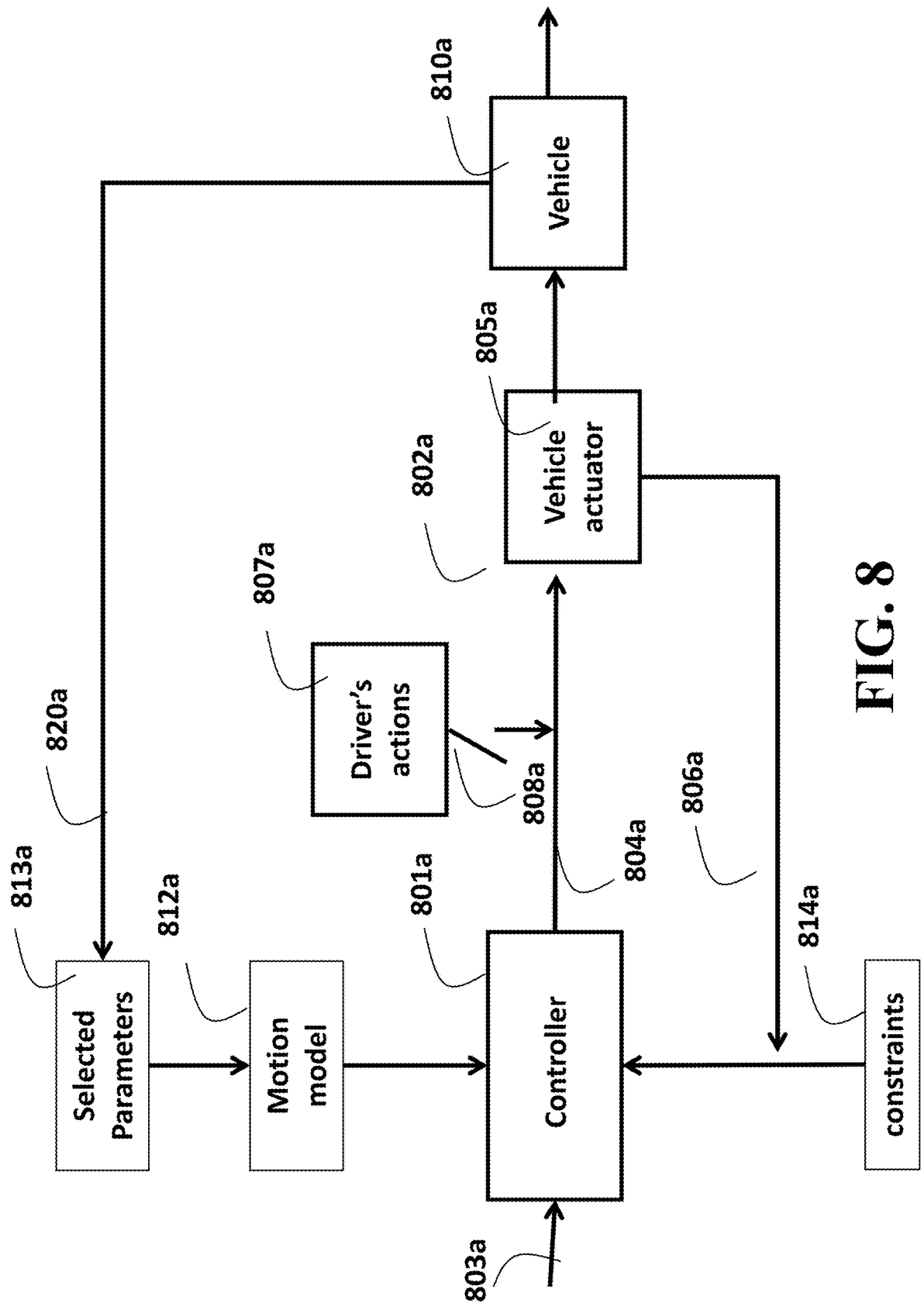
FIG. 8 shows a block diagram for how the selected parameters interact with various vehicle controllers according to some embodiments.

FIG. 8 shows a block diagram for how the selected parameters interact with various vehicle controllers according to some embodiments. The controller $801a$ is a model-based controller that uses a motion model $812a$ that includes parameters of friction function $813a$ to generate control command $804a$ to actuators $802a$ of the controlled vehicle. For instance, the controller can be a proportional-integra-derivative (PID) controller, or the controller $810a$ can be a model-predictive controller (MPC). The controller $810a$ can either be a stand-alone controller for autonomous driving or complementing actions of driver $807a$ for semi-autonomous driving. For instance, for autonomous driving the controller receives a reference trajectory $803a$, state and input constraints $814a$, and the motion model $812a$, and generates a desired steering angle $804a$ of the wheel to control the lateral motion, and/or a desired velocity or acceleration $804a$ to control the longitudinal motion of the vehicle. For semi-autonomous driving, the driver $807a$ turns the steering wheel to obtain a steering angle $808a$, possibly also with a longitudinal acceleration generated by the throttle/brake input. In such a case, the MPC can generate a correction of the driver's inputs to stabilize the vehicle in case of driving at-the-limits. In such a case, the inputs $806a$ from the actuators are used by the MPC. One part of the motion model $812a$ includes the tire friction function parameterized by the selected parameters $813a$, wherein the parameters are updated whenever the PDF of tire friction function is updated depending on new motion data $820a$ from the vehicle $810a$.

In one embodiment, a nonlinear model predictive controller (NMPC) controls a vehicle using a determined parametrized tire friction function. An MPC operates by optimizing a desired future behavior $803a$ of the vehicle in presence of constraints $814a$. The MPC uses an internal prediction model using the motion model $812a$ and selected parameters $813a$ defining the tire friction function, and optimizes the vehicle behavior given model $812a$ and parameters $813a$. In such a case, the MPC determines the optimal control commands to obtain an optimal state trajectory. In order to do this, the variation of the friction over the prediction horizon is determined using the tire friction function defining the relation between slippage of the wheel and the friction.

In one embodiment, the control command is determined by solving a tracking-type optimal control problem formulation $$\min_{X,U} \frac{T}{N} \sum_{i=0}^{N-1} \|F_{ref}(x_i) - y_{ref}(\tau_i, d)\|_W^2 + \|x_i - x_{ref}\|_Q^2 +$$

$$\|u_i - u_{ref}\|_R^2 + \|F_{ref}(x_N) - y_{ref}(\tau_N, d)\|_{W_N}^2 + \|x_N - x_{ref}\|_{Q_N}^2$$

-continued $$\text{s.t.} \quad \begin{aligned} x_0 &= \hat{x}_0, \\ x_{i+1} &= F_i(x_i, u_i), \quad i = 0, \ldots, N-1, \\ 0 &\geq h(x_i, u_i), \quad i = 0, \ldots, N-1, \\ 0 &\geq r(x_N), \end{aligned}$$

where $x_{i+1} = F_i(x_i, u_i)$ is the discrete-time motion model $0 \geq h(x_i, u_i)$, 812a and $0 \geq r(x_N)$, are the constraints 814a. The optimal control problem is known as a nonlinear programming (NLP), and there are various methods to solve this problem.

In one embodiment, the NLP is solved using sequential quadratic programming (SQP) using real-time iterations (RTIs). The RTI approach is based on one SQP iteration per control time step, and using a continuation-based warm starting of the state and control trajectories from one time step to the next. Each iteration consists of two steps: (1) Preparation phase: discretize and linearize the system dynamics, linearize the remaining constraint functions, and evaluate the quadratic objective approximation to build the optimal control structured QP subproblem. (2) Feedback phase: solve the QP to update the current values for all optimization variables and obtain the next control input to apply feedback to the system.

Another embodiment uses blockstructured factorization techniques with low-rank updates to preconditioning of an iterative solver within a primal active-set algorithm. This results in a relatively simple to implement, but computationally efficient and reliable QP solver that is suitable for embedded control hardware.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for controlling a vehicle by jointly estimating a state of a vehicle and a function of a tire friction of a vehicle traveling on a road, wherein the tire friction function is a nonlinear function describing a friction between a surface of the road and a tire of the vehicle as a function of wheel slip of a wheel of the vehicle, wherein the state of the vehicle includes a velocity and a heading rate of the vehicle, comprising:

a memory configured to store a particle filter maintaining a set of particles, each particle includes an estimation of a state of the vehicle, an estimation of probability density function (pdf) of the tire friction function, and a weight indicative of a probability of the particle;

a processor configured to execute the particle filter to update the particles based on a motion model and a measurement model of the vehicle, control commands moving the vehicle and measurements of the state where the vehicle moved according to the control commands; and generate a control command based on the motion of the vehicle, the weighted combinations of the state of the vehicle and the pdf of the tire friction function weighted according corresponding weights of the particles; and submit the control command to at least one actuator of the vehicle.

2. The system of claim 1, wherein, to update a particle, the particle filter is configured to update the state of the particle using the motion model, a sample of the pdf of the tire friction function, and the control input;

compare the updated state of the particle with the measurement of the state to update the weight of the particle; and update the pdf of the tire friction function of the particle based on the updated state of the particle.

3. The system of claim 2, wherein the pdf of the tire friction function of the particle is updated to reduce a difference between the updated state of the particle and a state determined according to the measurement model with the measurement of the state.

4. The system of claim 2, wherein the updated state of the particle is updated probabilistically subject to noise, and wherein the particle filter is configured to update the pdf of the tire friction function based on a difference between the probabilistically updated state of the particle and a state of the particle updated deterministically without the noise to reduce an error between the updated state of the vehicle and the measurement of the state.

5. The system of claim 3, wherein the measurement model of the vehicle includes the tire friction function, and wherein the updated state of the vehicle is updated based on a difference between the updated state of the particle subject to noise and the measurement of the state using the measurement model including the sample of the tire friction function.

6. The system of claim 1, wherein the PDF of the tire friction function for each particle is a Gaussian process represented as a weighted combination of a set of basis functions, wherein each weight of each function has a Gaussian probability distribution, and wherein to update the PDF of the tire friction function the processor is configured to update the Gaussian probability distribution of at least some weights of the weighted combination of the set of basis functions.

7. The system of claim 6, wherein the processor for each particle is configured to
update the weights of the weighted combination of basis functions based on the updated state; and
update the PDF of the tire friction function using the combination of the basis function weighted with the updated weights.

8. The system of claim 7, wherein the processor, to determine the weights of the weighted combination of basis functions for each particle is configured to
submit the state and the basis functions to a static function mapping the state and the basis function to a set of numerical values;
determine, using a probabilistic function and the set of numerical values, distributions of the weights of the weighted combination of basis function; and
sample the mean of the distributions of the weights to produce the weights of the weighted combination of basis functions.

9. The system of claim 8, wherein the probabilistic function is a matrix-Normal distribution parametrized by the numerical values.

10. The system of claim 1, wherein the processor is configured to
adjust a value of the sample of the tire friction function to reduce an error between the state and a measurement of the state according to the measurement model; and
update the probability distribution of the tire friction function to increase a probability of drawing the adjusted value of the sample from the updated probability distribution of the tire friction function.

11. The system of claim 1, wherein the processor is configured to
fit parameters of a parameterized tire model to the sample of the tire friction function;
determine a control command using a current friction corresponding to a current slip of the tire according to the parameterized tire model; and
submit the control command to an actuator of the vehicle to move the vehicle on the road.

12. The system of claim 11, wherein the parametrized tire model is a Pacejka tire model, and wherein the controller is a model predictive controller (MPC) configured to determine the control command using the motion model of the vehicle including the friction.

13. The system of claim 1, wherein the control input include commands specifying values of one or combination of a steering angle of the wheels of the vehicle and a rotational velocity of the wheels, and wherein the measurements include values of one or combination of a rotation rate of the vehicle and an acceleration of the vehicle, and wherein the state trajectories include a sequence of states, each state includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

14. A method for controlling a vehicle by jointly estimating a state of a vehicle and a function of a tire friction of a vehicle traveling on a road, wherein the tire friction function is a nonlinear function describing a friction between a surface of the road and a tire of the vehicle as a function of wheel slip of a wheel of the vehicle, wherein the state of the vehicle includes a velocity and a heading rate of the vehicle, wherein the method uses a processor coupled to a memory storing a particle filter maintaining a set of particles, each particle includes an estimation of a state of the vehicle, an estimation of probability density function (pdf) of the tire friction function, and a weight indicative of a probability of the particle, wherein the processor is coupled with stored instructions implementing the method, wherein the instructions, when executed by the processor carry out steps of the method, comprising:
executing the particle filter to update the particles based on a motion model and a measurement model of the vehicle, control commands moving the vehicle and measurements of the state where the vehicle moved according to the control commands;
generating a control command based on the motion of the vehicle, the weighted combinations of the state of the vehicle and the pdf of the tire friction function weighted according corresponding weights of the particles; and
submitting the control command to at least one actuator of the vehicle.

15. The method of claim 14, wherein, to update a particle, the particle filter is configured for
updating the state of the particle using the motion model, a sample of the pdf of the tire friction function, and the control input;
comparing the updated state with the measurement of the state to update the weight of the particle; and
updating the pdf of the tire friction function of the particle based on the updated state particle.

16. A non-transitory computer readable storage medium embodied thereon a program executable by a processor for performing a method, the medium stores a particle filter maintaining a set of particles, each particle includes an estimation of a state of the vehicle, an estimation of probability density function (pdf) of the tire friction function, and a weight indicative of a probability of the particle, the method comprising:
executing the particle filter to update the particles based on a motion model and a measurement model of the vehicle, control commands moving the vehicle and measurements of the state where the vehicle moved according to the control commands;
generating a control command based on the motion of the vehicle, the weighted combinations of the state of the vehicle and the pdf of the tire friction function weighted according corresponding weights of the particles; and
submitting the control command to at least one actuator of the vehicle.

* * * * *